United States Patent
Guo et al.

(10) Patent No.: US 10,938,526 B2
(45) Date of Patent: Mar. 2, 2021

(54) SIGNAL SENDING METHOD, SIGNAL RECEIVING METHOD, TERMINAL DEVICE, AND NETWORK DEVICE

(71) Applicant: Huawei Technologies Co., Ltd., Shenzhen (CN)

(72) Inventors: Zhiheng Guo, Beijing (CN); Xinqian Xie, Beijing (CN); Xingqing Cheng, Beijing (CN); Xinghua Song, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/786,314

(22) Filed: Feb. 10, 2020

(65) Prior Publication Data

US 2020/0177328 A1 Jun. 4, 2020

Related U.S. Application Data

(63) Continuation of application No. PCT/CN2018/099493, filed on Aug. 9, 2018.

(30) Foreign Application Priority Data

Aug. 11, 2017 (CN) .......................... 201710687865.3
Jan. 12, 2018 (CN) .......................... 201810032284.0
May 11, 2018 (CN) .......................... 201810450862.2

(51) Int. Cl.
*H04L 5/00* (2006.01)
*H04L 27/26* (2006.01)
*H04W 72/04* (2009.01)

(52) U.S. Cl.
CPC ............ *H04L 5/001* (2013.01); *H04L 5/0048* (2013.01); *H04L 5/0053* (2013.01);
(Continued)

(58) Field of Classification Search
None
See application file for complete search history.

(56) References Cited

U.S. PATENT DOCUMENTS

| 6,983,883 B2 * | 1/2006 | Ridling ................ G01G 19/083 |
| | | 177/136 |
| 7,318,209 B2 * | 1/2008 | Aipperspach ........ H03K 5/1565 |
| | | 716/113 |

(Continued)

FOREIGN PATENT DOCUMENTS

| CN | 102835087 A | 12/2012 |
| CN | 103152294 A | 6/2013 |

(Continued)

OTHER PUBLICATIONS

Ericsson, "On uplink half-tone shift," 3GPP TSG RAN WG1 NR Ad-Hoc#2, R1-1710880, Qingdao, P.R.China, Jun. 27-30, 2017, 2 pages.

*Primary Examiner* — Berhanu Tadese
(74) *Attorney, Agent, or Firm* — Slater Matsil, LLP

(57) ABSTRACT

This application provides a signal sending method, a signal receiving method, a terminal device, and a network device. The method includes: generating, by a terminal device, OFDM symbols; and sending, by the terminal device, at least two OFDM symbols to a network device in a first time unit, and sending at least two OFDM symbols to the network device in a second time unit. Phase offsets of the OFDM symbols in the first time unit are equal to phase offsets of the OFDM symbols in the second time unit, the phase offset of a first OFDM symbol in the first time unit is not equal to the phase offset of at least one OFDM symbol other than the first OFDM symbol in the first time unit, and duration of the first time unit is the same as duration of the second time unit.

20 Claims, 20 Drawing Sheets

(52) U.S. Cl.
CPC ..... *H04L 27/2613* (2013.01); *H04W 72/0446* (2013.01); *H04W 72/0453* (2013.01)

(56) References Cited

U.S. PATENT DOCUMENTS

| | | | | |
|---|---|---|---|---|
| 10,153,839 B2* | 12/2018 | Zhang | H04L 5/0007 |
| 10,326,628 B2* | 6/2019 | Liu | H04W 72/0453 |
| 10,383,154 B2* | 8/2019 | Wang | H04W 48/18 |
| 10,425,203 B2* | 9/2019 | Liu | H04W 56/00 |
| 10,560,227 B2* | 2/2020 | Tang | H04L 1/1887 |
| 10,567,206 B2* | 2/2020 | Wang | H04L 27/2666 |
| 10,581,640 B2* | 3/2020 | Liu | H04B 7/0615 |
| 10,608,693 B2* | 3/2020 | Zhang | H04L 5/0082 |
| 10,616,881 B2* | 4/2020 | Liu | H04L 5/0048 |
| 10,651,969 B2* | 5/2020 | Dong | H04L 25/03834 |
| 10,652,070 B2* | 5/2020 | Sun | H04L 5/0048 |
| 10,667,226 B2* | 5/2020 | Wu | H04W 4/70 |
| 10,694,409 B2* | 6/2020 | Ryu | H04W 76/27 |
| 10,715,373 B2* | 7/2020 | Kim | H04L 27/2666 |
| 10,728,079 B2* | 7/2020 | Abdoli | H04L 27/2602 |
| 10,743,371 B2* | 8/2020 | Niu | H04L 5/0048 |
| 2003/0213113 A1* | 11/2003 | McMillan | E21B 41/04 29/281.1 |
| 2004/0099269 A1* | 5/2004 | Hale | A61M 15/002 128/203.16 |
| 2004/0202617 A1* | 10/2004 | Rabinowitz | A61K 31/00 424/46 |
| 2006/0106742 A1* | 5/2006 | Bochicchio | G01G 19/083 705/414 |
| 2006/0137336 A1* | 6/2006 | Krimbacher | F15B 15/204 60/415 |
| 2006/0261164 A1* | 11/2006 | Bochicchio | G01G 23/3742 235/385 |
| 2007/0008984 A1* | 1/2007 | Philips | G06F 5/14 370/412 |
| 2007/0028916 A1* | 2/2007 | Hale | A61K 9/007 128/200.14 |
| 2007/0031340 A1* | 2/2007 | Hale | A61K 9/007 424/45 |
| 2007/0109936 A1* | 5/2007 | Goossens | G11B 7/0948 369/53.33 |
| 2007/0122353 A1* | 5/2007 | Hale | A61K 9/0078 424/46 |
| 2007/0210156 A1* | 9/2007 | Bochicchio | G06Q 10/08 235/385 |
| 2008/0019314 A1* | 1/2008 | Gorokhov | H04L 25/03866 370/330 |
| 2008/0038363 A1* | 2/2008 | Zaffaroni | A61M 15/002 424/502 |
| 2011/0268101 A1* | 11/2011 | Wang | H04L 67/104 370/344 |
| 2012/0039409 A1* | 2/2012 | Popovic | G01S 1/20 375/260 |
| 2013/0076566 A1* | 3/2013 | Jiang | H01Q 3/26 342/373 |
| 2013/0176952 A1* | 7/2013 | Shin | H04W 72/042 370/329 |
| 2014/0016653 A1 | 1/2014 | Oh et al. | |
| 2014/0314128 A1* | 10/2014 | Li | H04B 1/709 375/150 |
| 2015/0009954 A1* | 1/2015 | Chang | H04L 27/2607 370/330 |
| 2015/0181546 A1* | 6/2015 | Freda | H04L 27/0014 370/336 |
| 2015/0326365 A1* | 11/2015 | Li | H04L 5/0023 370/330 |
| 2016/0044681 A1* | 2/2016 | Zhou | H04L 5/0051 370/329 |
| 2016/0337105 A1* | 11/2016 | Lawton | H04L 1/0026 |
| 2017/0019905 A1* | 1/2017 | Ko | H04W 72/08 |
| 2017/0055297 A1* | 2/2017 | Da | H04L 27/2613 |
| 2017/0201989 A1* | 7/2017 | Fakoorian | H04L 5/0046 |
| 2017/0223648 A1* | 8/2017 | Shin | H04J 11/0073 |
| 2017/0238344 A1* | 8/2017 | McGowan | H04L 5/0048 370/329 |
| 2017/0251443 A1* | 8/2017 | Shin | H04L 5/0098 |
| 2017/0311326 A1* | 10/2017 | Wong | H04W 72/0453 |
| 2018/0063820 A1* | 3/2018 | Xiong | H04W 72/042 |
| 2018/0091267 A1* | 3/2018 | Kim | H04L 27/2602 |
| 2018/0092080 A1* | 3/2018 | Kim | H04W 72/044 |
| 2018/0184408 A1* | 6/2018 | Xue | H04L 27/2613 |
| 2018/0198659 A1* | 7/2018 | Ko | H04L 27/2662 |
| 2018/0220465 A1* | 8/2018 | Zhang | H04L 1/00 |
| 2018/0270008 A1* | 9/2018 | Yi | H04W 72/1289 |
| 2018/0287846 A1* | 10/2018 | Kim | H04L 27/2666 |
| 2018/0294942 A1* | 10/2018 | Byun | H04L 5/1469 |
| 2018/0343629 A1* | 11/2018 | Choi | H04W 56/001 |
| 2019/0081842 A1* | 3/2019 | Kim | H04W 56/001 |
| 2019/0116592 A1* | 4/2019 | Moon | H04L 5/0044 |
| 2019/0123872 A1* | 4/2019 | Au | H04L 5/003 |
| 2019/0124687 A1* | 4/2019 | Yang | H04L 27/0006 |
| 2019/0149184 A1* | 5/2019 | Jung | H04B 1/40 455/90.2 |
| 2019/0149384 A1* | 5/2019 | Kim | H04L 27/2666 370/328 |
| 2019/0150110 A1* | 5/2019 | Ko | H04L 5/0053 370/350 |
| 2019/0173632 A1* | 6/2019 | Liu | H04L 5/0007 |
| 2019/0173653 A1* | 6/2019 | Wu | H04L 27/2607 |
| 2019/0190761 A1* | 6/2019 | Liu | H04L 5/0007 |
| 2019/0215122 A1* | 7/2019 | Gong | H04W 72/0413 |
| 2019/0215216 A1* | 7/2019 | Abdoli | H04L 27/2666 |
| 2019/0215877 A1* | 7/2019 | Qian | H04L 27/0014 |
| 2019/0229867 A1* | 7/2019 | Yi | H04L 5/0048 |
| 2019/0245727 A1* | 8/2019 | Park | H04L 27/2607 |
| 2019/0254073 A1* | 8/2019 | Sheng | H04W 74/0833 |
| 2019/0268204 A1* | 8/2019 | Axmon | H04L 27/2665 |
| 2019/0327037 A1* | 10/2019 | Yoshimoto | H04L 5/001 |
| 2019/0342130 A1* | 11/2019 | Sun | H04L 5/0044 |
| 2019/0349238 A1* | 11/2019 | Martinez | H04L 27/2656 |
| 2019/0357264 A1* | 11/2019 | Yi | H04L 5/001 |
| 2020/0014508 A1* | 1/2020 | Guo | H04L 5/0091 |
| 2020/0068596 A1* | 2/2020 | Zhang | H04L 5/0007 |
| 2020/0092030 A1* | 3/2020 | Ju | H04L 5/0053 |
| 2020/0100300 A1* | 3/2020 | Xie | H04W 74/006 |
| 2020/0137703 A1* | 4/2020 | Liu | H04W 74/0833 |
| 2020/0177328 A1* | 6/2020 | Guo | H04L 5/0048 |
| 2020/0178316 A1* | 6/2020 | Liu | H04W 74/08 |
| 2020/0178333 A1* | 6/2020 | Liu | H04W 74/006 |
| 2020/0187159 A1* | 6/2020 | Ko | H04L 5/0051 |
| 2020/0213067 A1* | 7/2020 | Cirik | H04L 1/0026 |
| 2020/0221506 A1* | 7/2020 | Jeon | H04W 74/0833 |
| 2020/0221508 A1* | 7/2020 | Huang | H04W 74/006 |
| 2020/0228383 A1* | 7/2020 | Kim | H04L 27/2613 |
| 2020/0229180 A1* | 7/2020 | Liu | H04L 5/0053 |
| 2020/0229236 A1* | 7/2020 | Ohara | H04W 72/04 |
| 2020/0229241 A1* | 7/2020 | Jeon | H04W 74/0833 |

FOREIGN PATENT DOCUMENTS

| | | | |
|---|---|---|---|
| KR | 20100092597 A | * | 8/2010 |
| KR | 101012444 B1 | * | 2/2011 |
| WO | 2016072216 A1 | | 5/2016 |

* cited by examiner

SIGNAL SENDING METHOD, SIGNAL RECEIVING METHOD, TERMINAL DEVICE, AND NETWORK DEVICE

CROSS-REFERENCE TO RELATED APPLICATIONS

This application is a continuation of International Application No. PCT/CN2018/099493, filed on Aug. 9, 2018, which claims priority to Chinese Patent Application No. 201710687865.3, filed on Aug. 11, 2017, Chinese Patent Application No. 201810032284.0, filed on Jan. 12, 2018 and Chinese Patent Application No. 201810450862.2, filed on May 11, 2018, all of which are hereby incorporated by reference in their entireties.

TECHNICAL FIELD

This application relates to communications technologies, and in particular, to a signal sending method, a signal receiving method, a terminal device, and a network device.

BACKGROUND

In a 5G communications system, at a working frequency of the 5G communications system, uplink coverage cannot match downlink coverage. Therefore, an uplink of the 5G communications system may be deployed in an uplink frequency band of 1.8 GHz of a long term evolution (LTE) communications system, to enhance the uplink coverage of the 5G communications system. For uplink transmission of the LTE communications system, a subcarrier mapping mode in which a carrier center is offset is used. To be specific, subcarrier mapping is offset by 7.5 kHz relative to a carrier center frequency. Therefore, when the uplink of the 5G communications system is deployed in the uplink frequency band of 1.8 GHz of the LTE system, a subcarrier mapping mode of the 5G communications system also correspondingly uses a mode in which a carrier center is offset, to ensure that subcarriers of the 5G communications system align with those of the LTE communications system.

In the prior art, when subcarrier mapping is performed in the mode in which a carrier center is offset, the terminal device offsets the carrier center by adjusting a phase offset at each sampling time point in a baseband signal. The phase offset is the same for each orthogonal frequency division multiplexing (OFDM) symbol.

However, if the method in the prior art is used in the 5G communications system, complexity of processing uplink transmission data by the terminal device is excessively high.

SUMMARY

This application provides a signal sending method, a signal receiving method, a terminal device, and a network device. The technical solutions are as follows.

A first aspect of this application provides a signal sending method, including:

First, a terminal device generates OFDM symbols.

Then, the terminal device sends at least two OFDM symbols to a network device in a first time unit, and sends at least two OFDM symbols to the network device in a second time unit.

Phase offsets of the OFDM symbols in the first time unit are equal to phase offsets of the OFDM symbols in the second time unit, the phase offset of a first OFDM symbol in the first time unit is not equal to the phase offset of at least one OFDM symbol other than the first OFDM symbol in the first time unit, and duration of the first time unit is the same as duration of the second time unit.

In this method, the first time unit and the second time unit in which the terminal device sends uplink signals to the network device each include at least two OFDM symbols, a phase offset of the first time unit is the same as that of the second time unit, and the phase offset of an OFDM symbol in the first time unit is different from the phase offset of at least one of the remaining OFDM symbols. Therefore, a period of the phase offset is extended compared with that in an existing method. Therefore, a frequency of processing performed by the terminal device because the period of the phase offset changes is reduced, so that processing complexity of the terminal device can be reduced.

In a possible design, the duration of the first time unit is duration of a slot corresponding to a subcarrier spacing of 15 kHz.

In a possible design, the duration of the first time unit is duration of a subframe.

In a possible design, the duration of the first time unit is a symbol length corresponding to a subcarrier spacing of 15 kHz.

In a possible design, when a subcarrier spacing of the OFDM symbols in the first time unit is 30 kHz, a quantity of the OFDM symbols in the first time unit is 2.

In a possible design, when a subcarrier spacing of the OFDM symbols in the first time unit is 60 kHz, a quantity of the OFDM symbols in the first time unit is 4.

In a possible design, the phase offset is a difference between a phase of a first time-domain sampling value at a first sampling time point when a first subcarrier mapping mode is used for an OFDM symbol and a phase of a second time-domain sampling value at the first sampling time point when a second subcarrier mapping mode is used for the same OFDM symbol.

In the first subcarrier mapping mode, a subcarrier center is mapped to a carrier frequency, and in the second subcarrier mapping mode, the subcarrier center is mapped to a frequency that has a preset offset value with the carrier frequency.

In a possible design, the preset offset value is 7.5 kHz.

A second aspect of this application provides a signal receiving method, including:

First, a network device receives at least two OFDM symbols from a terminal device in a first time unit, and receives at least two OFDM symbols in a second time unit, where phase offsets of the OFDM symbols in the first time unit are equal to phase offsets of the OFDM symbols in the second time unit, the phase offset of a first OFDM symbol in the first time unit is not equal to the phase offset of at least one OFDM symbol other than the first OFDM symbol in the first time unit, and duration of the first time unit is the same as duration of the second time unit.

Then, the network device demodulates the at least two OFDM symbols received in the first time unit and the at least two OFDM symbols received in the second time unit.

In a possible design, the network device receives OFDM symbols from the terminal device in a third time unit, and receives OFDM symbols from the terminal device in a fourth time unit, where phase offsets of the OFDM symbols in the third time unit are equal to phase offsets of the OFDM symbols in the fourth time unit, and duration of the third time unit is the same as duration of the fourth time unit.

In this method, the third time unit and the fourth time unit in which the terminal device sends uplink signals to the network device each include at least two OFDM symbols, a phase offset of the third time unit is the same as that of the fourth time unit, and a phase offset of an OFDM symbol in the third time unit is different from a phase offset of at least one of the remaining OFDM symbols. Therefore, when terminal device using different subcarrier spacings simultaneously send uplink signals to the network device, as long as the duration of the third time unit of each terminal device is the same and the phase offset of the third time unit is the same, the network device can perform phase compensation on the uplink signals sent by the terminal devices, thereby avoiding excessively high complexity of phase compensation.

In a possible design, the network device receives an OFDM symbol from a first terminal device and an OFDM symbol from a second terminal device in a fifth time unit, where a phase offset of the OFDM symbol of the first terminal device in the fifth time unit is equal to a phase offset of the OFDM symbol of the second terminal device in the fifth time unit.

In a possible design, the duration of the first time unit is duration of a slot corresponding to a subcarrier spacing of 15 kHz.

In a possible design, the duration of the first time unit is duration of a subframe.

In a possible design, the duration of the first time unit is a symbol length corresponding to a subcarrier spacing of 15 kHz.

In a possible design, when a subcarrier spacing of the OFDM symbols in the first time unit is 30 kHz, a quantity of the OFDM symbols in the first time unit is 2.

In a possible design, when a subcarrier spacing of the OFDM symbols in the first time unit is 60 kHz, a quantity of the OFDM symbols in the first time unit is 4.

In a possible design, the phase offset is a difference between a phase of a first time-domain sampling value at a first sampling time point when a first subcarrier mapping mode is used for an OFDM symbol and a phase of a second time-domain sampling value at the first sampling time point when a second subcarrier mapping mode is used for the same OFDM symbol.

In the first subcarrier mapping mode, a subcarrier center is mapped to a carrier frequency, and in the second subcarrier mapping mode, the subcarrier center is mapped to a frequency that has a preset offset value with the carrier frequency.

In a possible design, the preset offset value is 7.5 kHz.

A third aspect of this application provides a terminal device, where the terminal device has functions for implementing the terminal device in the first aspect. The functions may be implemented by hardware, or may be implemented by hardware executing corresponding software. The hardware or the software includes one or more modules corresponding to the foregoing functions.

In a possible design, the terminal device may include a processing module and a sending module, and these modules may perform corresponding functions in the foregoing method. For example, the processing module is configured to generate an orthogonal frequency division multiplexing OFDM symbol, and the sending module is configured to: send at least two OFDM symbols to a network device in a first time unit, and send at least two OFDM symbols to the network device in a second time unit.

A fourth aspect of this application provides a network device, and the network device has functions of implementing the network device in the second aspect. The functions may be implemented by hardware, or may be implemented by hardware executing corresponding software. The hardware or the software includes one or more modules corresponding to the foregoing functions.

In a possible design, the terminal device may include a receiving module and a processing module, and these modules may perform corresponding functions in the foregoing method. For example, the receiving module is configured to: receive at least two orthogonal frequency division multiplexing OFDM symbols from a terminal device in a first time unit, and receive at least two OFDM symbols in a second time unit; and the processing module is configured to demodulate the at least two OFDM symbols received in the first time unit and the at least two OFDM symbols received in the second time unit.

A fifth aspect of this application provides a chip, and the chip may be used for a terminal device. The chip includes at least one communications interface, at least one processor, and at least one memory, where the communications interface, the processor, and the memory are interconnected by using a circuit (or by using a bus in some cases), and the processor invokes an instruction stored in the memory to perform the following method: generating OFDM symbols; and sending at least two OFDM symbols to a network device in a first time unit, and sending at least two OFDM symbols to the network device in a second time unit, where phase offsets of the OFDM symbols in the first time unit are equal to phase offsets of the OFDM symbols in the second time unit, the phase offset of a first OFDM symbol in the first time unit is not equal to the phase offset of at least one OFDM symbol other than the first OFDM symbol in the first time unit, and duration of the first time unit is the same as duration of the second time unit.

In a possible design, the duration of the first time unit is duration of a slot corresponding to a subcarrier spacing of 15 kHz.

In a possible design, the duration of the first time unit is duration of a subframe.

In a possible design, the duration of the first time unit is a symbol length corresponding to a subcarrier spacing of 15 kHz.

In a possible design, when a subcarrier spacing of the OFDM symbols in the first time unit is 30 kHz, a quantity of the OFDM symbols in the first time unit is 2.

In a possible design, when a subcarrier spacing of the OFDM symbols in the first time unit is 60 kHz, a quantity of the OFDM symbols in the first time unit is 4.

In a possible design, the phase offset is a difference between a phase of a first time-domain sampling value at a first sampling time point when a first subcarrier mapping mode is used for an OFDM symbol and a phase of a second time-domain sampling value at the first sampling time point when a second subcarrier mapping mode is used for the same OFDM symbol.

In the first subcarrier mapping mode, a subcarrier center is mapped to a carrier frequency, and in the second subcarrier mapping mode, the subcarrier center is mapped to a frequency that has a preset offset value with the carrier frequency.

In a possible design, the preset offset value is 7.5 kHz.

A sixth aspect of this application provides a chip, and the chip may be used for a network device. The chip includes at least one communications interface, at least one processor, and at least one memory, where the communications interface, the processor, and the memory are interconnected by using a circuit (or by using a bus in some cases), and the processor invokes an instruction stored in the memory to perform the following method: receiving at least two OFDM symbols from a terminal device in a first time unit, and receiving at least two OFDM symbols in a second time unit, where phase offsets of the OFDM symbols in the first time unit are equal to phase offsets of the OFDM symbols in the second time unit, the phase offset of a first OFDM symbol in the first time unit is not equal to the phase offset of at least one OFDM symbol other than the first OFDM symbol in the first time unit, and duration of the first time unit is the same as duration of the second time unit; and demodulating the at least two OFDM symbols received in the first time unit and the at least two OFDM symbols received in the second time unit.

In a possible design, the duration of the first time unit is duration of a slot corresponding to a subcarrier spacing of 15 kHz.

In a possible design, the duration of the first time unit is duration of a subframe.

In a possible design, the duration of the first time unit is a symbol length corresponding to a subcarrier spacing of 15 kHz.

In a possible design, when a subcarrier spacing of the OFDM symbols in the first time unit is 30 kHz, a quantity of the OFDM symbols in the first time unit is 2.

In a possible design, when a subcarrier spacing of the OFDM symbols in the first time unit is 60 kHz, a quantity of the OFDM symbols in the first time unit is 4.

In a possible design, the phase offset is a difference between a phase of a first time-domain sampling value at a first sampling time point when a first subcarrier mapping mode is used for an OFDM symbol and a phase of a second time-domain sampling value at the first sampling time point when a second subcarrier mapping mode is used for the same OFDM symbol.

In the first subcarrier mapping mode, a subcarrier center is mapped to a carrier frequency, and in the second subcarrier mapping mode, the subcarrier center is mapped to a frequency that has a preset offset value with the carrier frequency.

In a possible design, the preset offset value is 7.5 kHz.

A seventh aspect of this application provides a terminal device, and the terminal device includes a memory and a processor. The memory is configured to store a program instruction, and the processor is configured to invoke the program instruction in the memory, to implement a function of the terminal device in the first aspect.

An eighth aspect of this application provides a network device, and the network device includes a memory and a processor. The memory is configured to store a program instruction, and the processor is configured to invoke the program instruction in the memory, to implement a function of the network device in the second aspect.

A ninth aspect of this application provides a non-volatile storage medium, and the non-volatile storage medium stores one or more pieces of program code. When a terminal device executes the program code, the terminal device performs a related method step performed by the terminal device in the first aspect.

A tenth aspect of this application provides a non-volatile storage medium, and the non-volatile storage medium stores one or more pieces of program code. When a network device executes the program code, the network device performs a related method step performed by the network device in the second aspect.

An eleventh aspect of this application provides a signal sending method, including: determining, by a network device, a downlink signal, where the downlink signal is determined based on a first frequency position; and sending, by the network device, the downlink signal to a terminal device.

In a possible design, that the downlink signal is determined based on a first frequency position includes: the downlink signal is a downlink baseband signal, and a phase of the downlink baseband signal is determined based on the first frequency position.

In a possible design, the first frequency position is a pre-defined frequency position.

In a possible design, the first frequency position is a frequency position determined based on indication information of the network device, and the indication information is used to indicate the first frequency position.

A twelfth aspect of this application provides a signal receiving method, including: receiving, by a terminal device, a downlink signal from a network device, where the downlink signal is determined based on a first frequency position, and the first frequency position is a pre-defined frequency position, or the first frequency position is a frequency position determined based on indication information of the network device; and demodulating, by the terminal device, the downlink signal.

In a possible design, that the downlink signal is determined based on a first frequency position includes: the downlink signal is a downlink baseband signal, and a phase of the downlink baseband signal is determined based on the first frequency position.

In a possible design, that the first frequency position is a pre-defined frequency position includes: the first frequency position is a center frequency position of a preset subcarrier in a preset frequency domain resource block.

In a possible design, the first frequency position is the frequency position determined based on the indication information of the network device, and the terminal device receives the indication information from the network device, where the indication information is used to indicate the first frequency position.

A thirteenth aspect of this application provides a network device, and the network device has functions of implementing the network device in the eleventh aspect. The functions may be implemented by hardware, or may be implemented by hardware executing corresponding software. The hardware or the software includes one or more modules corresponding to the foregoing functions.

In a possible design, the network device may include a processing module and a sending module, and these modules may perform corresponding functions in the foregoing method.

A fourteenth aspect of this application provides a terminal device, and the terminal device has functions of implementing the terminal device in the twelfth aspect. The functions may be implemented by hardware, or may be implemented by hardware executing corresponding software. The hardware or the software includes one or more modules corresponding to the foregoing functions.

In a possible design, the terminal device may include a receiving module and a processing module, and these modules may perform corresponding functions in the foregoing method.

A fifteenth aspect of this application provides a chip, and the chip may be used for a network device. The chip includes at least one communications interface, at least one processor, and at least one memory, where the communications interface, the processor, and the memory are interconnected by using a circuit (or by using a bus in some cases), and the processor invokes an instruction stored in the memory to perform the method according to the eleventh aspect.

A sixteenth aspect of this application provides a chip, and the chip may be used for a terminal device. The chip includes at least one communications interface, at least one processor, and at least one memory, where the communications interface, the processor, and the memory are interconnected by using a circuit (or by using a bus in some cases), and the processor invokes an instruction stored in the memory to perform the method according to the twelfth aspect.

A seventeenth aspect of this application provides a network device, and the network device includes a memory and a processor. The memory is configured to store a program instruction, and the processor is configured to invoke the program instruction in the memory, to implement a function of the network device in the eleventh aspect.

An eighteenth aspect of this application provides a terminal device, and the terminal device includes a memory and a processor. The memory is configured to store a program instruction, and the processor is configured to invoke the program instruction in the memory, to implement a function of the terminal device in the twelfth aspect.

A nineteenth aspect of this application provides a non-volatile storage medium, and the non-volatile storage medium stores one or more pieces of program code. When a network device executes the program code, the network device performs a related method step performed by the network device in the eleventh aspect.

A twentieth aspect of this application provides a non-volatile storage medium, and the non-volatile storage medium stores one or more pieces of program code. When a terminal device executes the program code, the terminal device performs a related method step performed by the terminal device in the twelfth aspect.

DETAILED DESCRIPTION OF ILLUSTRATIVE EMBODIMENTS

Figure 1:
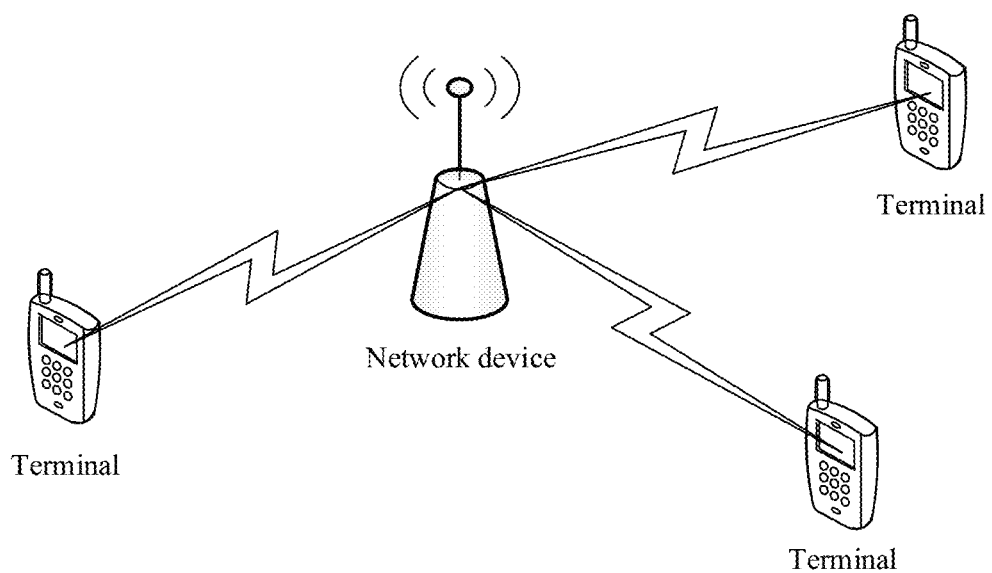
FIG. 1 is a diagram of a system architecture to which a signal sending and receiving method is applied according to this application.

FIG. 1 is a diagram of a system architecture to which a signal sending and receiving method is applied according to this application. As shown in FIG. 1, the system includes a network device and at least one terminal device, and the network device and the terminal device work in an uplink shared frequency band of an LTE communications system and a 5G communications system. The terminal device may communicate with the network device by using a carrier of the 5G communications system, and the terminal device may also communicate with the network device by using an uplink carrier of the LTE communications system.

For ease of understanding, the following explains network elements in this application.

A terminal device may be a wireless terminal or a wired terminal. The wireless terminal may be a device that provides a terminal with voice and/or data connectivity, a handheld device with a radio connection function, or another processing device connected to a radio modem. The wireless terminal may communicate with one or more core networks through a radio access network (such as a RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communications service PCS) phone, a cordless telephone set, a session initiation protocol (SIP) phone, a wireless local loop (WLL) station, or a personal digital assistant (PDA). The wireless terminal may also be referred to as a system, a subscriber unit (Subscriber Unit), a subscriber station, a mobile station, a mobile console, a remote station, an access point, a remote terminal, an access terminal, a user terminal, user equipment, or a user agent.

A network device may be specifically a base station in this application, and the base station may be a device that is in an access network and that communicates with a wireless terminal by using one or more sectors over an air interface. The base station may be configured to mutually convert a received over-the-air frame and an IP packet and serve as a router between the wireless terminal and a remaining part of the access network, where the remaining part of the access network may include an internet protocol (IP) network. The base station may further coordinate attribute management of the air interface.

Figure 2:
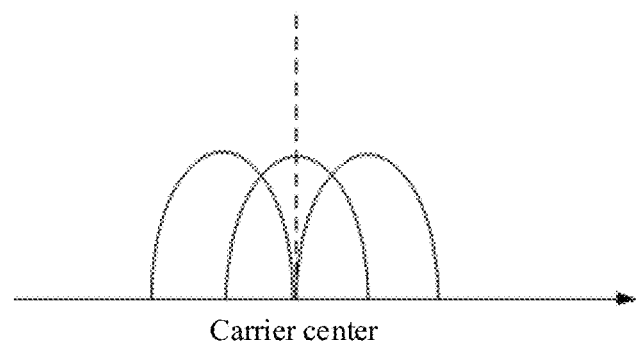
FIG. 2 is a schematic diagram of mapping a subcarrier center to a carrier frequency.
Figure 3:
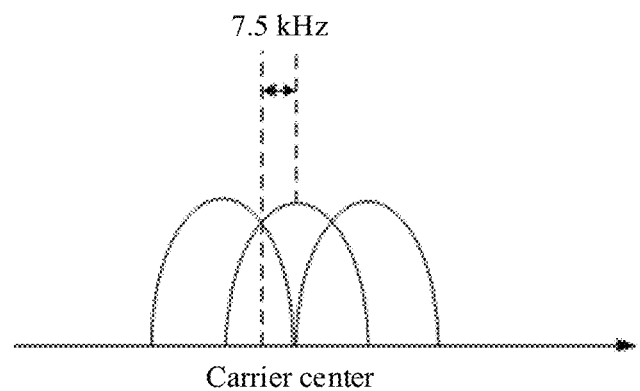
FIG. 3 is a schematic diagram of offsetting subcarrier center mapping by 7.5 kHz relative to a carrier frequency.

Uplink coverage at a working frequency in the 5G communications system cannot match downlink coverage. Therefore, in an optional solution, an uplink of the 5G communications system may be deployed in an uplink frequency band of 1.8 GHz in the LTE communications system. For uplink transmission of the LTE communications system, a subcarrier mapping mode in which a carrier center is offset is used. To be specific, subcarrier center mapping is offset by 7.5 kHz relative to a carrier center frequency. In addition, for downlink transmission in the LTE communications system, a subcarrier mapping mode in which a subcarrier is mapped to a carrier frequency is used. To be specific, a subcarrier center is mapped to the carrier frequency. The carrier frequency may be specifically a carrier center frequency. FIG. 2 is a schematic diagram of mapping a subcarrier center to a carrier frequency, and FIG. 3 is a schematic diagram of offsetting subcarrier center mapping by 7.5 kHz relative to a carrier frequency. It can be learned from FIG. 2 and FIG. 3 that, in LTE uplink transmission, the subcarrier center mapping is offset by 7.5 kHz relative to the carrier frequency. When an uplink frequency band of the LTE communications system is used for uplink communication of the 5G communications system, to ensure alignment between a subcarrier of the 5G communications system and that of the LTE communications system, a subcarrier mapping mode of the 5G communications system may also use the subcarrier mapping mode shown in FIG. 3.

In an optional manner, when different subcarrier mapping modes are used, there is a phase offset between time-domain sampling values at a sampling time point in a signal generated by a baseband. A phase offset (a specific meaning of the phase offset is explained in detail in the following embodiment) for each OFDM symbol is equal. For example, for two OFDM symbols that each include 2048 sampling time points except a cyclic prefix (CP), a phase offset between a time-domain sampling value that is at an $x^{th}$ sampling time point and that is obtained after the mapping mode shown in FIG. 2 is used for the first OFDM symbol and a time-domain sampling value that is at the $x^{th}$ sampling time point and that is obtained after the mapping mode shown in FIG. 3 is used for the first OFDM symbol is S1, a phase offset between a time-domain sampling value that is at the $x^{th}$ sampling time point and that is obtained after the mapping mode shown in FIG. 2 is used for the second OFDM symbol and a time-domain sampling value that is at the $x^{th}$ sampling time point and that is obtained after the mapping mode shown in FIG. 3 is used for the second OFDM symbol is S2, and S1 is equal to S2, where x is a positive integer.

Figure 4:
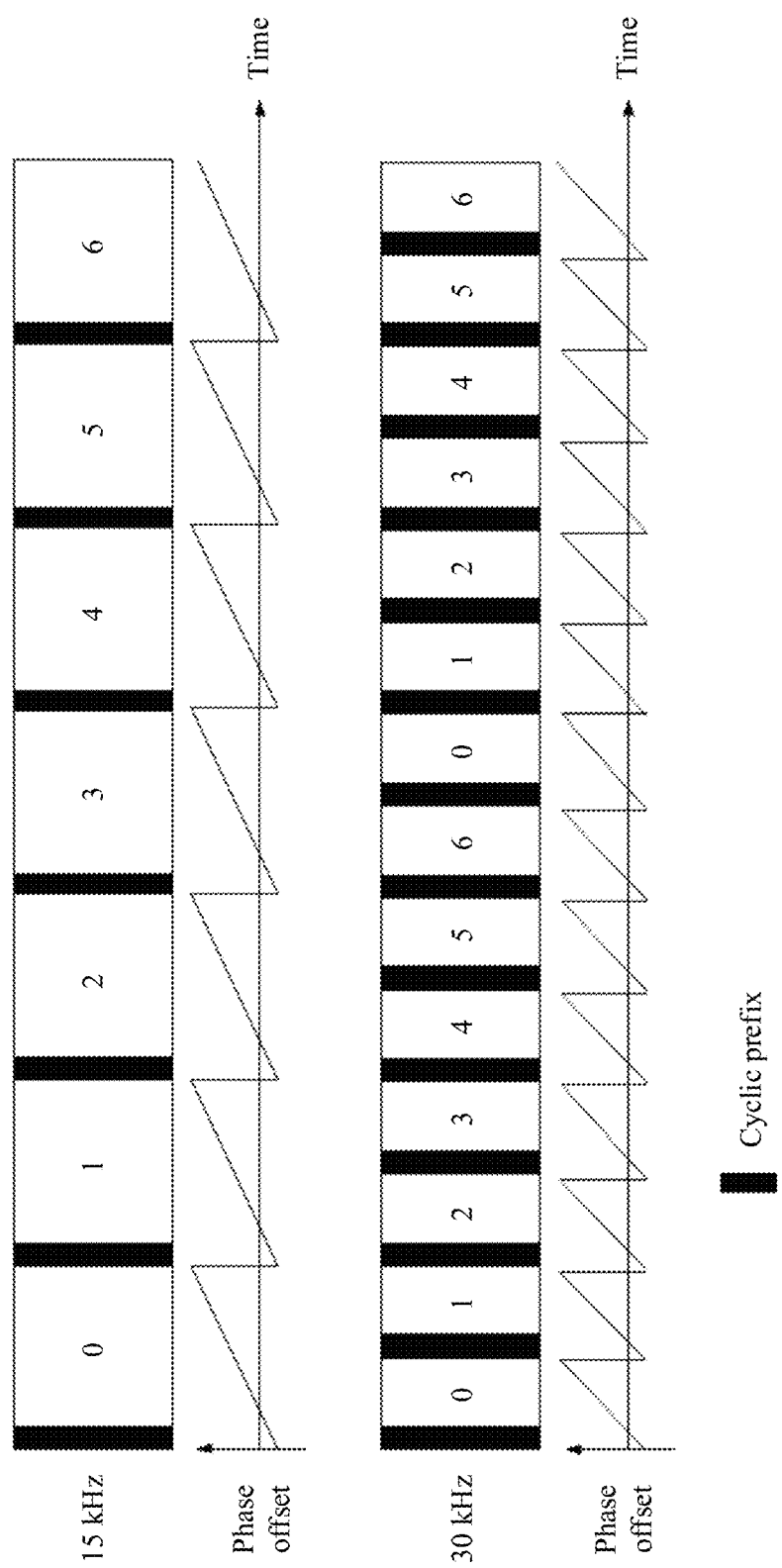
FIG. 4 is a schematic diagram of phase offsets of a communications system having a plurality of subcarrier spacings.

The 5G communications system supports a plurality of subcarrier spacings. For example, the subcarrier spacings may be 15 kHz, 30 kHz, 60 kHz, and the like. For a communications system having a plurality of subcarrier spacings, a phase of a sampling time point may be offset with reference to a method in LTE. FIG. 4 is a schematic diagram of phase offsets of a communications system having a plurality of subcarrier spacings. It is assumed that the communications system uses a subcarrier mapping mode of uplink data in LTE. As shown in FIG. 4, for an uplink signal (including one slot having seven symbols) using a subcarrier spacing of 15 kHz, a phase offset of each OFDM symbol is equal. For example, the phase offset of a $0^{th}$ OFDM symbol is the same as the phase offset of a $1^{st}$ OFDM symbol. Similarly, for an uplink signal (including two slots each having seven symbols) using a subcarrier spacing of 30 kHz, a phase offset of each OFDM symbol is equal. For example, the phase offset of a $0^{th}$ OFDM symbol is the same as the phase offset of a $1^{st}$ OFDM symbol. However, on the whole, the phase offset of the uplink signal using the subcarrier spacing of 15 kHz is different from that of the uplink signal using the subcarrier spacing of 30 kHz.

If subcarrier mapping is performed in uplink transmission according to a method of the LTE communications system, in other words, a phase offset of each OFDM symbol is equal, for the terminal device, each time an OFDM symbol is generated, that is, a new phase offset period is generated, corresponding adjustment needs to be performed on processing by the terminal device. Therefore, processing complexity of the terminal device is relatively high. For the network device receiving the uplink data, when the network device simultaneously receives uplink signals that are sent by a plurality of terminal devices supporting different subcarrier spacings, the network device needs to separately compensate for a phase offset of an uplink signal of each subcarrier spacing. Consequently, complexity of performing phase compensation by the network device is high. Therefore, this application further provides a solution.

The following first describes a concept of phase offset in detail.

Referring to the foregoing FIG. 2 and FIG. 3, subcarrier mapping modes include a first subcarrier mapping mode shown in FIG. 2 and a second subcarrier mapping mode shown in FIG. 3. In the first subcarrier mapping mode, a subcarrier center is mapped to a carrier frequency, and in the second subcarrier mapping mode, the subcarrier center is mapped to a frequency that has a preset offset value with the carrier frequency. Optionally, the carrier frequency may be a carrier center frequency. In addition, optionally, the preset offset value may be 7.5 kHz, or the preset offset value may be a sum of 7.5 kHz and an integer quantity of subcarrier spacings. For example, the preset offset value may be a sum of 7.5 kHz and one subcarrier spacing of 30 kHz, in other words, the preset offset value is 37.5 kHz.

For a particular OFDM symbol, the OFDM symbol may include a plurality of sampling time points. For a particular sampling time point T, when the OFDM symbol performs subcarrier mapping by using the first subcarrier mapping mode, a first time-domain sampling value at T corresponds to a phase X1; when the OFDM symbol performs subcarrier mapping by using the second subcarrier mapping mode, a second time-domain sampling value at T corresponds to another phase X2. In this case, a phase offset of the two time-domain sampling values at T is X2−X1. The phase offset in this application is a difference between a phase of a first time-domain sampling value at a first sampling time point when a first subcarrier mapping mode is used for an OFDM symbol and a phase of a second time-domain sampling value at the first sampling time point when a second subcarrier mapping mode is used for the same OFDM symbol. The first sampling time point is any sampling time point in the OFDM symbol.

Figure 5:
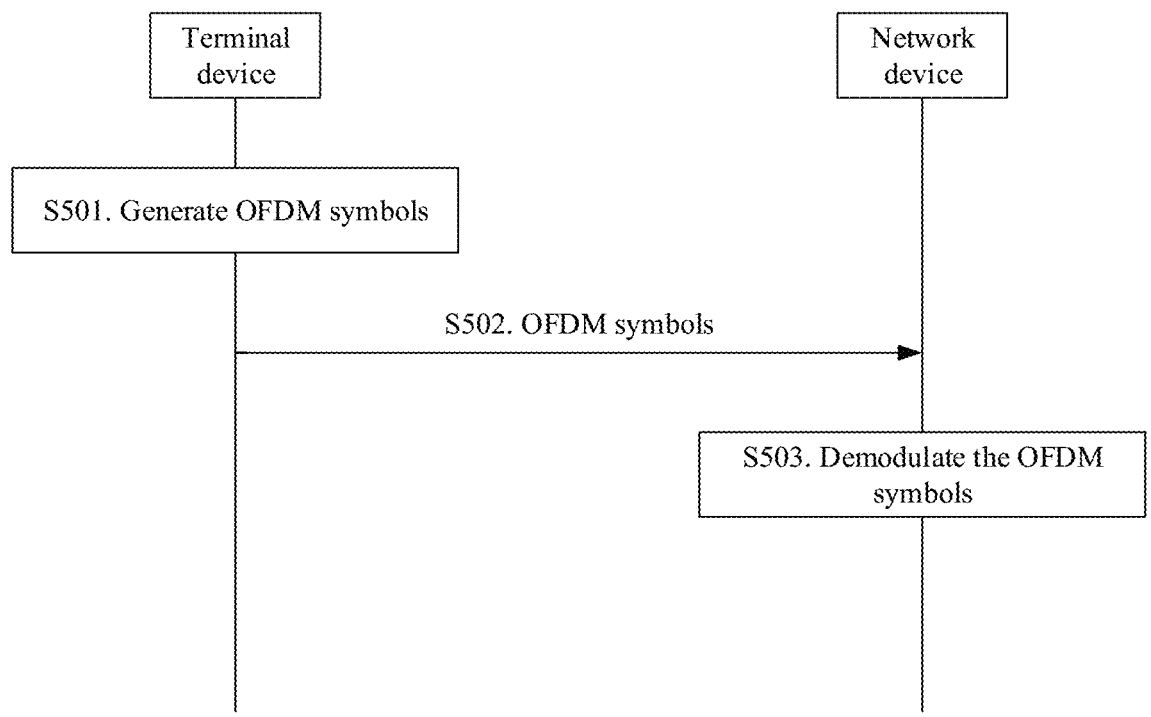
FIG. 5 is an interaction flowchart of Embodiment 1 of a signal sending and receiving method according to this application.

FIG. 5 is an interaction flowchart of Embodiment 1 of a signal sending and receiving method according to this application. As shown in FIG. 5, the method includes the following steps.

S501. A terminal device generates OFDM symbols.

S502. The terminal device sends at least two OFDM symbols to a network device in a first time unit, and sends at least two OFDM symbols to the network device in a second time unit.

Duration of the first time unit is the same as duration of the second time unit.

Phase offsets of the OFDM symbols in the first time unit are equal to phase offsets of the OFDM symbols in the second time unit. The phase offset of a first OFDM symbol in the first time unit is not equal to the phase offset of at least one OFDM symbol other than the first OFDM symbol in the first time unit.

S503. After receiving the at least two OFDM symbols in the first time unit and receiving the at least two OFDM symbols in the second time unit, the network device demodulates the at least two OFDM symbols received in the first time unit and the at least two OFDM symbols received in the second time unit.

Figure 6:
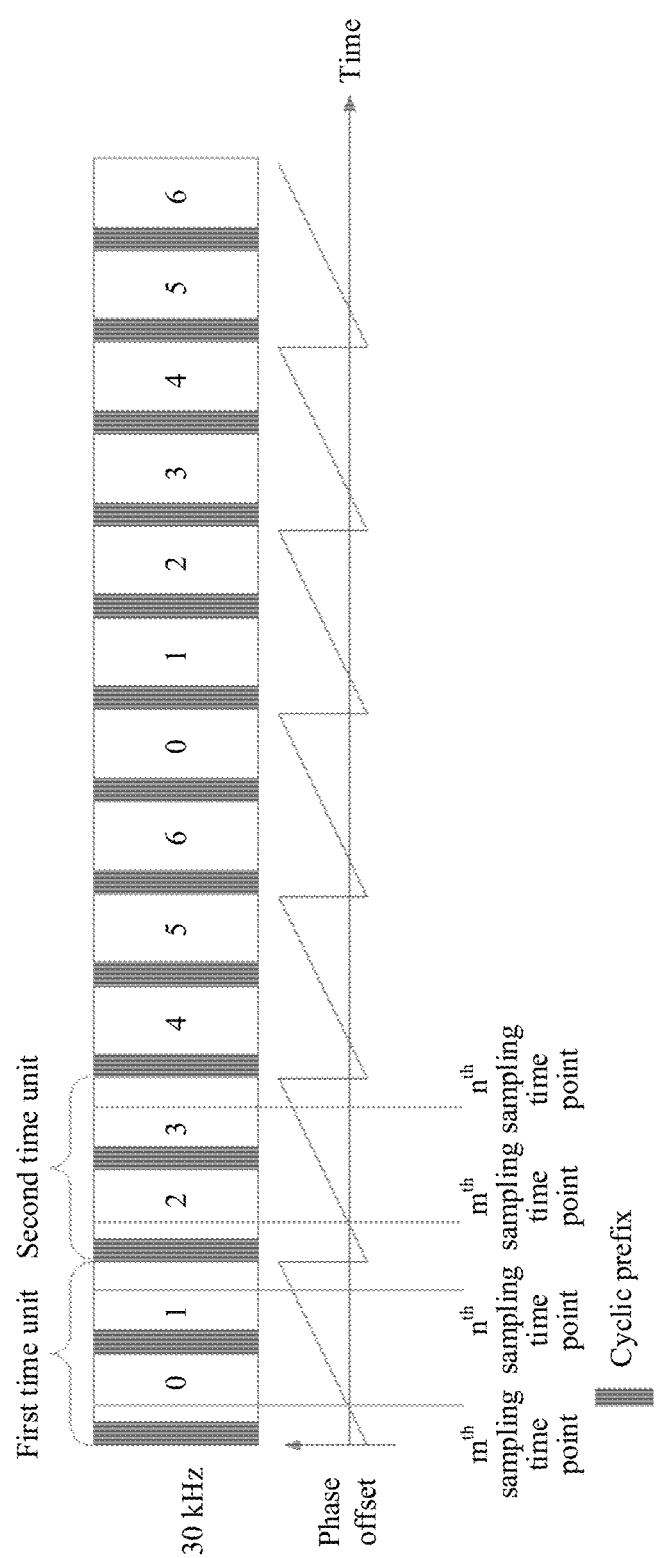
FIG. 6 is a schematic diagram of sending OFDM symbols by a terminal according to this embodiment.

FIG. 6 is a schematic diagram of sending the OFDM symbols by the terminal according to this embodiment. As shown in FIG. 6, a subcarrier spacing of 30 kHz is used as an example. The terminal device sends uplink signals to the network device at a subcarrier spacing of 30 kHz. The first time unit and the second time unit each correspond to a time interval of two OFDM symbols. In other words, the duration of the first time unit is the same as the duration of the second time unit.

That phase offsets of the OFDM symbols in the first time unit are equal to phase offsets of the OFDM symbols in the second time unit is explained below with reference to FIG. 6.

It is assumed that there are k sampling time points in each of the first time unit and the second time unit, and k is a positive integer. In this case, the phase offset at an $m^{th}$ sampling time point in the first time unit is equal to the phase offset at the $m^{th}$ sampling time point in the second time unit, where m may be any positive integer less than or equal to k. Therefore, on the whole, an overall phase offset of the first time unit is equal to an overall phase offset of the second time unit.

That the phase offset of a first OFDM symbol in the first time unit is not equal to the phase offset of at least one OFDM symbol other than the first OFDM symbol in the first time unit is explained below with reference to FIG. 6.

It is assumed that there are k sampling time points in the first time unit, and k is a positive integer. In this case, for an $m^{th}$ sampling time point in the first time unit, the phase offset at the $m^{th}$ sampling time point is different from the phase offset at an $n^{th}$ sampling time point in the first time unit, where m and n are positive integers less than or equal to k, and m is not equal to n. Similarly, in the second time unit, the phase offset at the $m^{th}$ sampling time point is also not equal to the phase offset at the $n^{th}$ sampling time point. To be specific, one period of the phase offset is the duration corresponding to the first time unit, and there is only one period of the phase offset in the first time unit.

It should be noted that this application may be applied to a case in which CP lengths of all OFDM symbols in the first time unit are equal. In addition, for a case in which the CP lengths of the OFDM symbols in the first time unit are not equal, it is assumed that a CP of an OFDM symbol L in the first time unit is a short CP, in other words, a CP length is relatively short; and a CP of an OFDM symbol M in the first time unit is an extended CP, in other words, a CP length is relatively long. The OFDM symbol L may be divided into two parts. A quantity of sampling time points in a first part is equal to a quantity of sampling time points in the OFDM symbol M. The first part and the OFDM symbol M may be processed by using the solutions in this application, and phase compensation may be performed on a network device side, and phase compensation may be independently performed on a remaining part of the OFDM symbol L according to the prior art.

In this embodiment, the phase offsets of the OFDM symbols in the first time unit are equal to the phase offsets of the OFDM symbols in the second time unit. Therefore, this embodiment also meets the case in which the CP lengths of the OFDM symbols in the first time unit are not equal.

In this embodiment, the first time unit and the second time unit in which the terminal device sends uplink signal to the network device include at least two OFDM symbols, a phase offset of the first time unit is the same as that of the second time unit, and the phase offset of an OFDM symbol in the first time unit is different from the phase offset of at least one of the remaining OFDM symbols. Therefore, a period of the phase offset is extended compared with that in an existing method. Therefore, a frequency of processing performed by the terminal device because the period of the phase offset changes is reduced, so that processing complexity of the terminal device can be reduced.

In another embodiment, the network device receives OFDM symbols from the terminal device in a third time unit, and receives OFDM symbols from the terminal device in a fourth time unit, where phase offsets of the OFDM symbols in the third time unit are equal to phase offsets of the OFDM symbols in the fourth time unit, and duration of the third time unit is the same as duration of the fourth time unit.

Specifically, the network device may receive the OFDM symbol from one terminal device in the third time unit, and receive the OFDM symbol from another terminal device in the fourth time unit. The OFDM symbols sent by the two terminal devices respectively use different subcarrier spacings. The duration of the third time unit is the same as the duration of the fourth time unit, and the phase offsets of the OFDM symbols in the third time unit are equal to that of the OFDM symbols in the fourth time unit. Therefore, after receiving the OFDM symbols in the third time unit and the fourth time unit, the network device may perform phase compensation on the OFDM symbols.

A specific example is used for description below.

Figure 7:
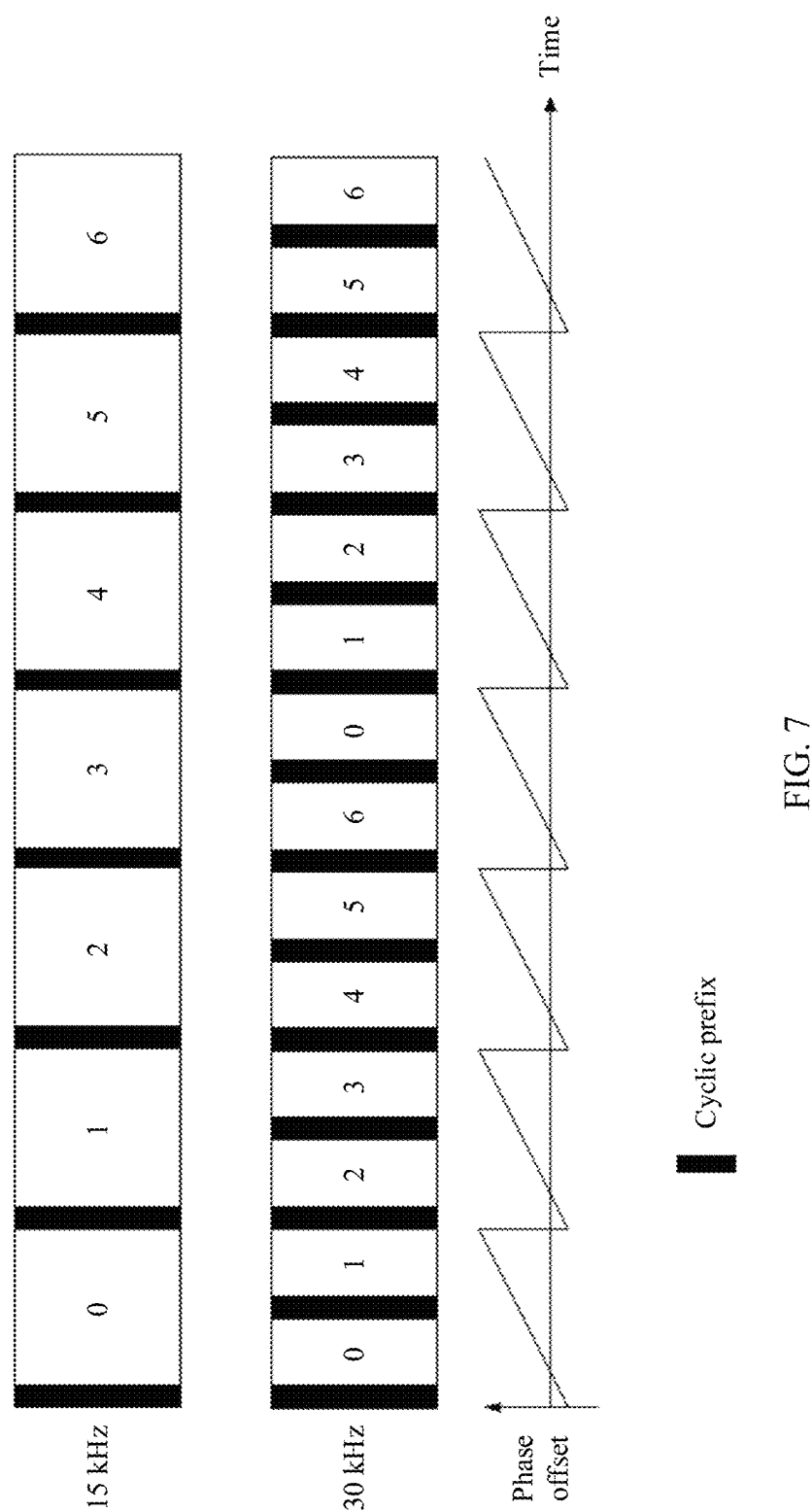
FIG. 7 is an example diagram of Embodiment 2 of a signal sending and receiving method according to this application.

FIG. 7 is an example diagram of Embodiment 2 of a signal sending and receiving method according to this application. As shown in FIG. 7, it is assumed that a network device simultaneously receives uplink signals from a first terminal device and a second terminal device. A subcarrier spacing of the first terminal device is 15 kHz, and a subcarrier spacing of the second terminal device is 30 kHz. A third time unit is time in which the first terminal device sends one OFDM symbol, and a fourth time unit is time in which the second terminal device sends two OFDM symbols. A phase offset of the first terminal device in the third time unit is the same as a phase offset of the second terminal device in the fourth time unit. In this case, after receiving the uplink signals sent by the first terminal device and the second terminal device, the network device may compensate for the uplink signals according to the third time unit.

In this embodiment, the third time unit and the fourth time unit in which the terminal device sends uplink signals to the network device include at least two OFDM symbols, a phase offset of the third time unit is the same as that of the fourth time unit, and a phase offset of the OFDM symbol in the third time unit is different from a phase offset of at least one remaining OFDM symbol. Therefore, when terminal device using different subcarrier spacings simultaneously send uplink signals to the network device, as long as the duration of the third time unit of each terminal device is the same and the phase offset of the third time unit is the same, the network device can perform phase compensation on the uplink signals sent by the terminal devices, thereby avoiding excessively high complexity of phase compensation.

In addition, in another possible embodiment, the network device receives an OFDM symbol from a first terminal device and an OFDM symbol from a second terminal device in a fifth time unit, where a phase offset of the OFDM symbol of the first terminal device in the fifth time unit is equal to a phase offset of the OFDM symbol of the second terminal device in the fifth time unit.

Specifically, the network device receives the OFDM symbols separately from the two terminal devices in a same time unit, namely, the fifth time unit. The OFDM symbols sent by the two terminal devices respectively use different subcarrier spacings. Because phase offsets of the OFDM symbols of the two terminal devices in the fifth time unit are equal, after receiving, in the fifth time unit, the OFDM symbols sent by the two terminal devices, the network device may perform phase compensation on the OFDM symbols.

In an optional implementation, when a subcarrier spacing of the OFDM symbols in the foregoing first time unit is 30 kHz, a quantity of the OFDM symbols in the first time unit is 2. This is also applicable to the second time unit.

In another optional implementation, when a subcarrier spacing of the OFDM symbols in the foregoing first time unit is 60 kHz, a quantity of the OFDM symbols in the first time unit is 4. This is also applicable to the second time unit.

In addition, optionally, duration of the first time unit may be a symbol length corresponding to a subcarrier spacing of 15 kHz, or duration of the first time unit may be duration of a slot corresponding to a subcarrier spacing of the 15 kHz, or duration of the first time unit may be duration of a subframe. Descriptions are separately provided below.

Figure 8:
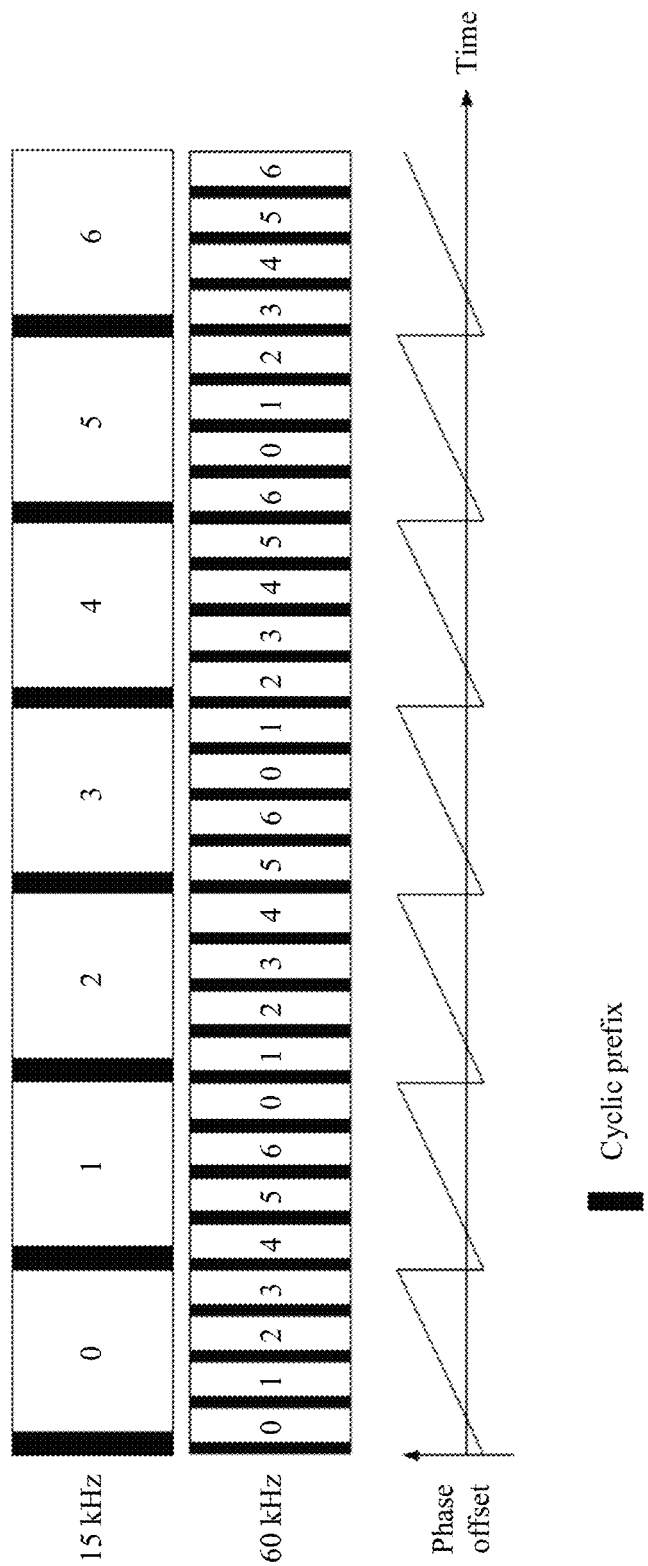
FIG. 8 is an example diagram in which duration of a first time unit is a symbol length corresponding to a subcarrier spacing of 15 kHz.

1. Duration of the First Time Unit is a Symbol Length Corresponding to a Subcarrier Spacing of 15 kHz FIG. 8 is an example diagram in which the duration of the first time unit is a symbol length corresponding to a subcarrier spacing of 15 kHz. Referring to FIG. 8 and FIG. 7, the first time unit corresponds to two symbols having the subcarrier spacing of 30 kHz, and corresponds to four symbols having the subcarrier spacing of 60 kHz. If receiving both uplink data having the subcarrier spacing of 15 kHz and uplink data having the subcarrier spacing of 30 kHz, the network device may perform phase compensation according to the first time unit. If receiving both uplink data having the subcarrier spacing of 15 kHz and uplink data having the subcarrier spacing of 60 kHz, the network device may also perform phase compensation according to the first time unit. By analogy, the network device may also perform phase compensation on uplink data having the subcarrier spacing of 30 kHz and uplink data having the subcarrier spacing of 60 kHz.

Figure 9:
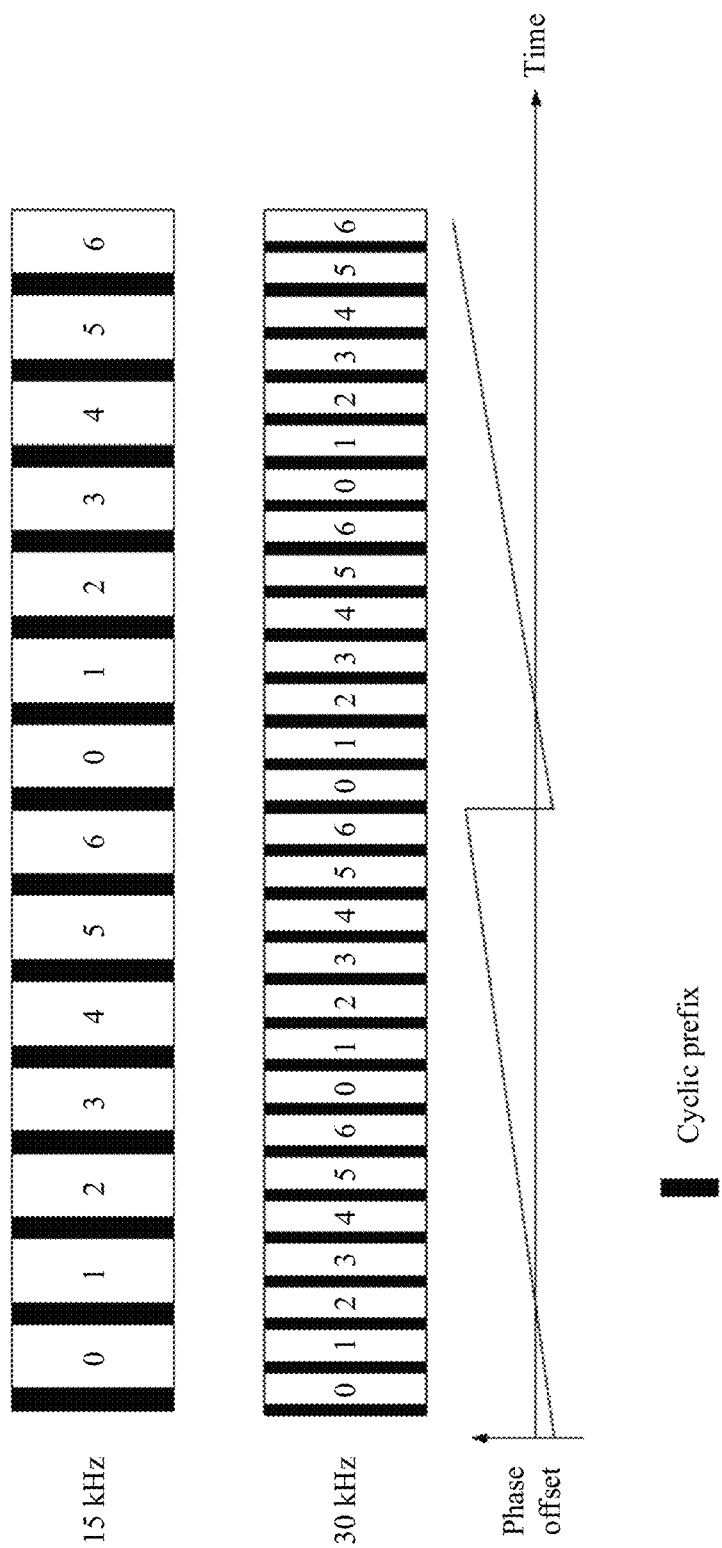
FIG. 9 is a schematic diagram in which duration of a first time unit is duration of a slot corresponding to a subcarrier spacing of 15 kHz.

2. Duration of the First Time Unit is Duration of a Slot Corresponding to a Subcarrier Spacing of 15 kHz FIG. 9 is a schematic diagram in which the duration of the first time unit is duration of a slot corresponding to a subcarrier spacing of 15 kHz. Referring to FIG. 9, the first time unit corresponds to a slot having the subcarrier spacing of 15 kHz, namely, seven OFDM symbols, and corresponds to two slots including seven symbols of 30 kHz. If receiving both uplink data having the subcarrier spacing of 15 kHz and uplink data having the subcarrier spacing of 30 kHz, the network device may perform phase compensation according to the first time unit.

3. Duration of the First Time Unit is Duration of a Subframe

Figure 10:
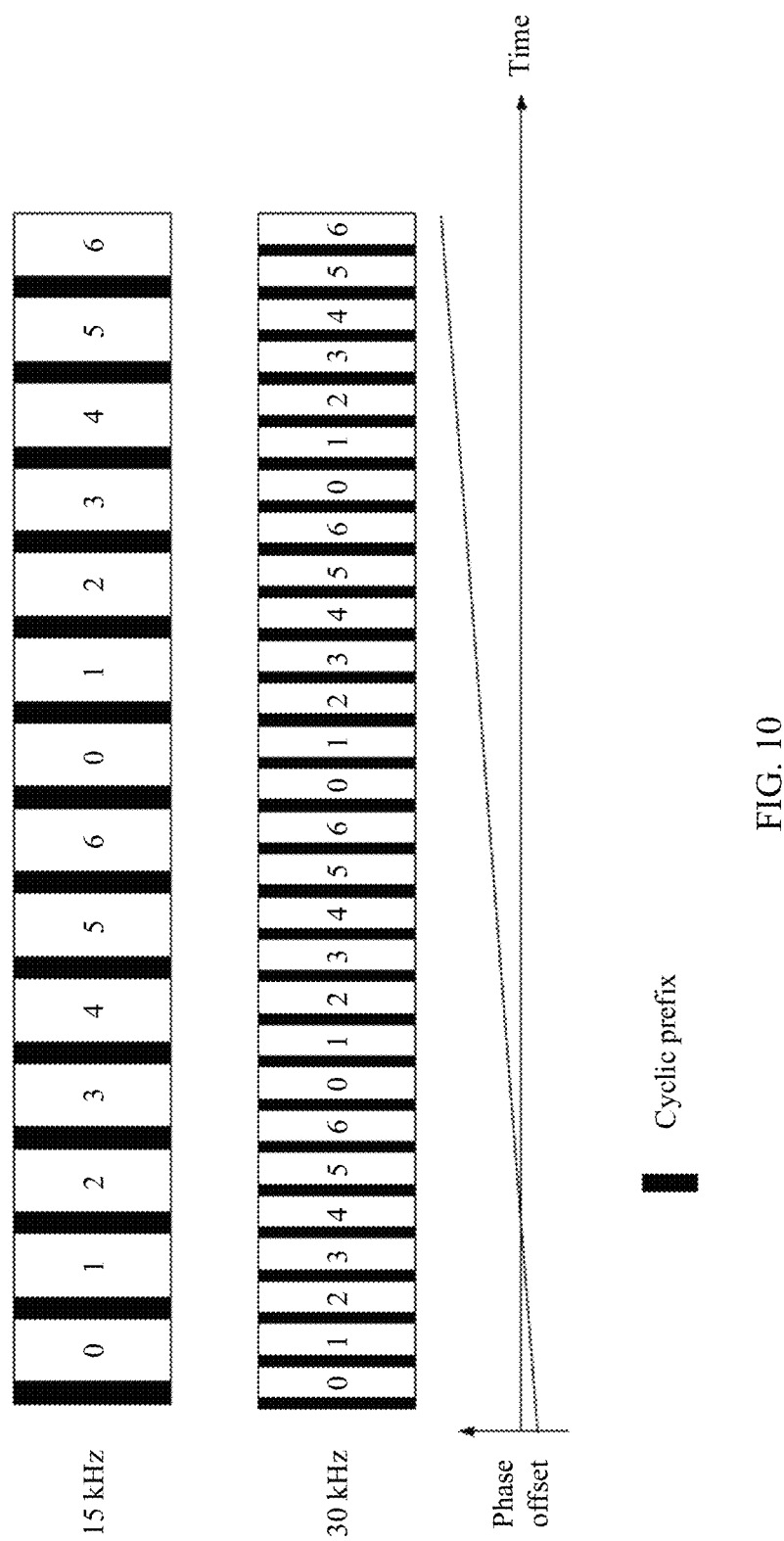
FIG. 10 is a schematic diagram in which duration of a first time unit is duration of a subframe.

FIG. 10 is a schematic diagram in which the duration of the first time unit is duration of a subframe. Referring to FIG. 10, the first time unit corresponds to a subframe, namely, two slots of 15 kHz, and corresponds to four slots including seven symbols of 30 kHz. If receiving both uplink data having the subcarrier spacing of 15 kHz and uplink data having the subcarrier spacing of 30 kHz, the network device may perform phase compensation according to the first time unit.

In another optional implementation, the phase offset specifically refers to a difference between a phase of a first time-domain sampling value at a first sampling time point when a first subcarrier mapping mode is used for an OFDM symbol and a phase of a second time-domain sampling value at the first sampling time point when a second subcarrier mapping mode is used for the same OFDM symbol. In the second subcarrier mapping mode, a subcarrier center is mapped to a frequency that has an offset of 7.5 kHz with the carrier frequency.

Explanations are provided below with reference to formulas used when the terminal device generates the OFDM symbols.

When using the first subcarrier mapping mode, the terminal device generates the OFDM symbols by using the following formula (1).

$$s_l^{(p,\mu)}(t) = \sum_{k=-\lfloor N_{RB}^{\mu} N_{sc}^{RB}/2 \rfloor}^{\lceil N_{RB}^{\mu} N_{sc}^{RB}/2 \rceil - 1} a_{k',l}^{(p,\mu)} \cdot e^{j2\pi k \Delta f(t - N_{CP,l} T_s)}$$

where $l$ represents an $l^{th}$ OFDM symbol in a subframe, a value range of t is $0 \leq t < (N_u + N_{CP,l}^{\mu})T_s$, $N_u$ is a quantity of sampling time points in the OFDM symbols except CPs, $N_{CP,l}^{\mu}$ is a quantity of sampling time points in the CP of the $l^{th}$ OFDM symbol, t represents a difference between a sampling time point in the $l^{th}$ OFDM symbol and a start time point of the OFDM symbol, $s_l^{(p,\mu)}(t)$ represents a time-domain sampling value at a sampling time point corresponding to given t, $T_s$ represents a time unit value, $\Delta f$ represents a subcarrier spacing, $N_{RB}^{\mu}$ represents a quantity of resource blocks, $N_{sc}^{RB}$ represents a quantity of subcarriers in a resource block, k represents a sequence number of a subcarrier, where $k' = k + \lfloor N_{RB}^{\mu} N_{sc}^{RB}/2 \rfloor$, and $a_{k',l}^{(p,\mu)}$ is a complex number value.

In addition, when using the second subcarrier mapping mode, the terminal device may generate the OFDM symbols by using the following formula (2).

$$s_l^{(p,\mu)}(t) = \sum_{k=-\lfloor N_{RB}^{\mu} N_{sc}^{RB}/2 \rfloor}^{\lceil N_{RB}^{\mu} N_{sc}^{RB}/2 \rceil - 1} a_{k',l}^{(p,\mu)} \cdot e^{j\left(2\pi k \Delta f(t - N_{CP,l} T_s) + \frac{2\pi \Delta f_{shift}(t - N_{CP,l} T_s)}{\Delta \phi}\right)}$$

where $\Delta f_{shift}$ is a subcarrier offset of the second subcarrier mapping mode relative to the first subcarrier mapping mode, and Δϕ is a phase offset that is of a sampling time point and that is caused by the subcarrier offset.

It can be learned from the foregoing formula that Δϕ and Δf$_{shift}$ are related to the sampling time point. Therefore, for different subcarrier spacings, it can be ensured that phase offsets are the same provided that it is ensured that Δf$_{shift}$ and the sampling time points are the same. Therefore, in this application, optionally, sampling time points having different subcarrier spacings may be preset to be the same, and same Δf$_{shift}$ is used for the different subcarrier spacings, so that it can be ensured that phase offsets are the same. Specifically, Δf$_{shift}$ is 7.5 kHz.

In addition, in the formula (2), Δf may be obtained by using the following Table 1, where u is a parameter that indicates a subcarrier spacing of signals.

TABLE 1

| μ | Δf = 2$^μ$ · 15[kHz] |
|---|---|
| 0 | 15 |
| 1 | 30 |
| 2 | 60 |
| 3 | 120 |
| 4 | 240 |
| 5 | 480 |

The following provides specific formula examples when the first time unit has different duration.

When the first time unit is a subframe, in other words, when the period of the phase offset is the subframe, a formula for generating the OFDM symbol may be represented by the following formula (3).

$$s_{\bar{l}}^{(p,\mu)}(t) = \sum_{k=-\lfloor N_{RB}^{\mu}N_{sc}^{RB}/2 \rfloor}^{\lceil N_{RB}^{\mu}N_{sc}^{RB}/2 \rceil - 1} a_{k',\bar{l}}^{(p,\mu)} \cdot e^{j\left(2\pi k \Delta f(t - N_{CP,\bar{l}}T_s) + \overbrace{2\pi \Delta f_{shift}\left(t + T_s \sum_{m=0}^{\bar{l}-1}(N_u + N_{CP,m}^{\mu})\right)}^{\Delta \phi}\right)}$$

When the first time unit is a symbol length having a subcarrier spacing of 15 kHz, in other words, when the period of the phase offset is the symbol length having a subcarrier spacing of 15 kHz, a formula for generating the OFDM symbol may be represented by the following formula (4).

$$s_{\bar{l}}^{(p,\mu)}(t) = \sum_{k=-\lfloor N_{RB}^{\mu}N_{sc}^{RB}/2 \rfloor}^{\lceil N_{RB}^{\mu}N_{sc}^{RB}/2 \rceil - 1} a_{k',\bar{l}}^{(p,\mu)} \cdot e^{j\left(2\pi k \Delta f(t - N_{CP,\bar{l}}T_s) + \overbrace{2\pi \Delta f_{shift}\left(t + T_s \sum_{m=0}^{mod(\bar{l},2^\mu)-1}(N_u + N_{CP,m}^{\mu})\right)}^{\Delta \phi}\right)}$$

When the first time unit is a duration having a subcarrier spacing of 15 kHz, in other words, when the period of the phase offset is the duration having the subcarrier spacing of 15 kHz, a formula for generating the OFDM symbol may be represented by the following formula (5).

$$s_{\bar{l}}^{(p,\mu)}(t) = \sum_{k=-\lfloor N_{RB}^{\mu}N_{sc}^{RB}/2 \rfloor}^{\lceil N_{RB}^{\mu}N_{sc}^{RB}/2 \rceil - 1} a_{k',\bar{l}}^{(p,\mu)} \cdot e^{j\left(2\pi k \Delta f(t - N_{CP,\bar{l}}T_s) + \overbrace{2\pi \Delta f_{shift}\left(t + T_s \sum_{m=0}^{mod(\bar{l},2^\mu \cdot N_{symb}^{\mu})-1}(N_u + N_{CP,m}^{\mu})\right)}^{\Delta \phi}\right)}$$

where N$_{symb}^μ$ is a quantity of OFDM symbols included in one slot, and a value of N$_{symb}^μ$ is 7 or 14.

It should be noted that the foregoing formula is merely a possible representation form, and certainly, a formula in another form may alternatively be used for description. This is not limited in this application.

For example, a start location of the 7$^{th}$ OFDM symbol may be represented by using the following formula (6).

$$t_{start,\bar{l}}^{\mu} = \begin{cases} 0 & \bar{l} = 0 \\ t_{start,\bar{l}-1}^{\mu} + (N_u + N_{CP,\bar{l}-1}) \cdot T_s & \text{otherwise} \end{cases}$$

When the first time unit is a subframe, in other words, when the period of the phase offset is the subframe, a formula for generating the OFDM symbol may be represented by the following formula (7).

$$s_{\bar{l}}^{(p,\mu)}(t) = \sum_{k=-\lfloor N_{RB}^{\mu}N_{sc}^{RB}/2 \rfloor}^{\lceil N_{RB}^{\mu}N_{sc}^{RB}/2 \rceil - 1} a_{k',\bar{l}}^{(p,\mu)} \cdot e^{j\left(2\pi k \Delta f(t - N_{CP,\bar{l}}T_s) + \overbrace{2\pi \Delta f_{shift}\left(t + t_{start,\bar{l}}^{\mu}\right)}^{\Delta \phi}\right)}$$

When the first time unit is a symbol length having a subcarrier spacing of 15 kHz, in other words, when the period of the phase offset is the symbol length having a subcarrier spacing of 15 kHz, a formula for generating the OFDM symbol may be represented by the following formula (8).

$$s_{\bar{l}}^{(p,\mu)}(t) = \sum_{k=-\lfloor N_{RB}^{\mu}N_{sc}^{RB}/2 \rfloor}^{\lceil N_{RB}^{\mu}N_{sc}^{RB}/2 \rceil - 1} a_{k',\bar{l}}^{(p,\mu)} \cdot e^{j\left(2\pi k \Delta f(t - N_{CP,\bar{l}}T_s) + \overbrace{2\pi \Delta f_{shift}\left(t + t_{start,\bar{l}}^{\mu=0} - t_{start,\lfloor \bar{l} \cdot 2^{-\mu} \rfloor}^{\mu}\right)}^{\Delta \phi}\right)}$$

Figure 11:
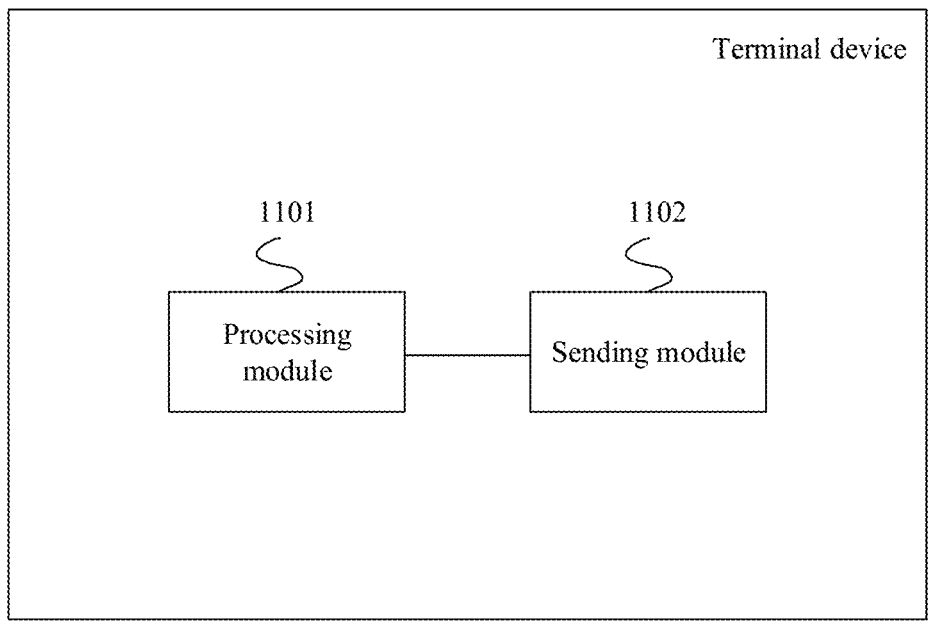
FIG. 11 is a structural diagram of modules of Embodiment 1 of a terminal device according to this application.

FIG. 11 is a structural diagram of modules of Embodiment 1 of a terminal device according to this application. As shown in FIG. 11, the terminal device includes: a processing module 1101, configured to generate OFDM symbols; and a sending module 1102, configured to: send at least two OFDM symbols to a network device in a first time unit, and send at least two OFDM symbols to the network device in a second time unit, where phase offsets of the OFDM symbols in the first time unit are equal to phase offsets of the OFDM symbols in the second time unit, the phase offset of a first OFDM symbol in the first time unit is not equal to the phase offset of at least one OFDM symbol other than the first OFDM symbol in the first time unit, and duration of the first time unit is the same as duration of the second time unit.

The terminal device is configured to implement the foregoing method embodiments. Implementation principles and technical effects of the terminal device are similar to those of the method embodiments. Details are not described herein again.

In an optional implementation, the duration of the first time unit is duration of a slot corresponding to a subcarrier spacing of 15 kHz.

In an optional implementation, the duration of the first time unit is duration of a subframe.

In an optional implementation, the duration of the first time unit is a symbol length corresponding to a subcarrier spacing of 15 kHz.

In an optional implementation, when a subcarrier spacing of the OFDM symbols in the first time unit is 30 kHz, a quantity of the OFDM symbols in the first time unit is 2.

In an optional implementation, when a subcarrier spacing of the OFDM symbols in the first time unit is 60 kHz, a quantity of the OFDM symbols in the first time unit is 4.

In an optional implementation, the phase offset is a difference between a phase of a first time-domain sampling value at a first sampling time point when a first subcarrier mapping mode is used for an OFDM symbol and a phase of a second time-domain sampling value at the first sampling time point when a second subcarrier mapping mode is used for the same OFDM symbol.

In the first subcarrier mapping mode, a subcarrier center is mapped to a carrier frequency, and in the second subcarrier mapping mode, the subcarrier center is mapped to a frequency that has a preset offset value with a carrier frequency.

In an optional implementation, the preset offset value is 7.5 kHz.

Figure 12:
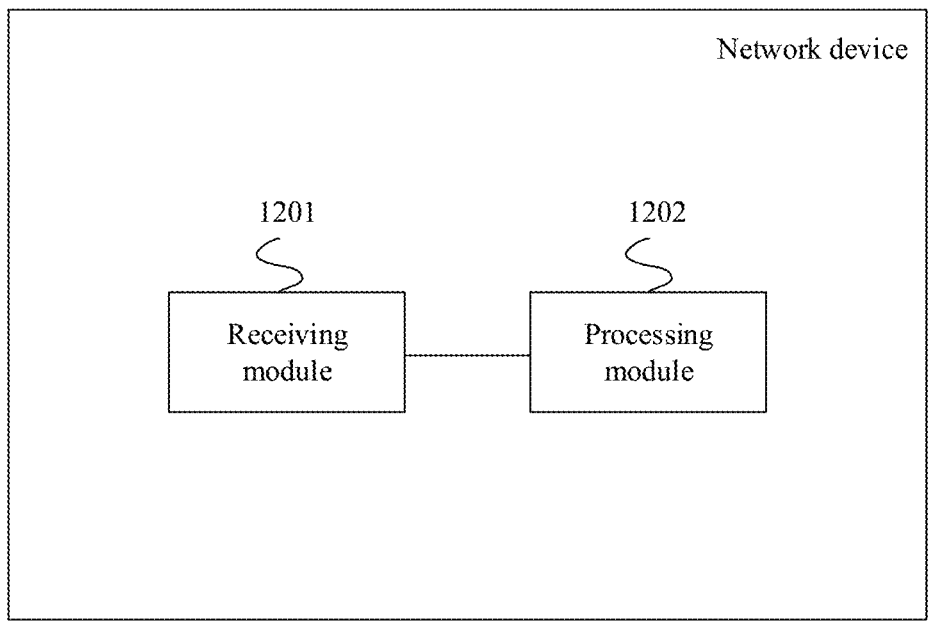
FIG. 12 is a structural diagram of modules of Embodiment 1 of a network device according to this application.

FIG. 12 is a structural diagram of modules of Embodiment 1 of a network device according to this application. As shown in FIG. 12, the network device includes: a receiving module 1201, configured to: receive at least two OFDM symbols from a terminal device in a first time unit, and receive at least two OFDM symbols in a second time unit, where phase offsets of the OFDM symbols in the first time unit are equal to phase offsets of the OFDM symbols in the second time unit, the phase offset of a first OFDM symbol in the first time unit is not equal to the phase offset of at least one OFDM symbol other than the first OFDM symbol in the first time unit, and duration of the first time unit is the same as duration of the second time unit; and a processing module 1202, configured to demodulate the at least two OFDM symbols received in the first time unit and the at least two OFDM symbols received in the second time unit.

The network device is configured to implement the foregoing method embodiments. Implementation principles and technical effects of the network device are similar to those of the method embodiments. Details are not described herein again.

In an optional implementation, the duration of the first time unit is duration of a slot corresponding to a subcarrier spacing of 15 kHz.

In an optional implementation, the duration of the first time unit is duration of a subframe.

In an optional implementation, the duration of the first time unit is a symbol length corresponding to a subcarrier spacing of 15 kHz.

In an optional implementation, when a subcarrier spacing of the OFDM symbols in the first time unit is 30 kHz, a quantity of the OFDM symbols in the first time unit is 2.

In an optional implementation, when a subcarrier spacing of the OFDM symbols in the first time unit is 60 kHz, a quantity of the OFDM symbols in the first time unit is 4.

In an optional implementation, the phase offset is a difference between a phase of a first time-domain sampling value at a first sampling time point when a first subcarrier mapping mode is used for an OFDM symbol and a phase of a second time-domain sampling value at the first sampling time point when a second subcarrier mapping mode is used for the same OFDM symbol.

In the first subcarrier mapping mode, a subcarrier center is mapped to a carrier frequency, and in the second subcarrier mapping mode, the subcarrier center is mapped to a frequency that has a preset offset value with a carrier frequency.

In an optional implementation, the preset offset value is 7.5 kHz.

Figure 13:
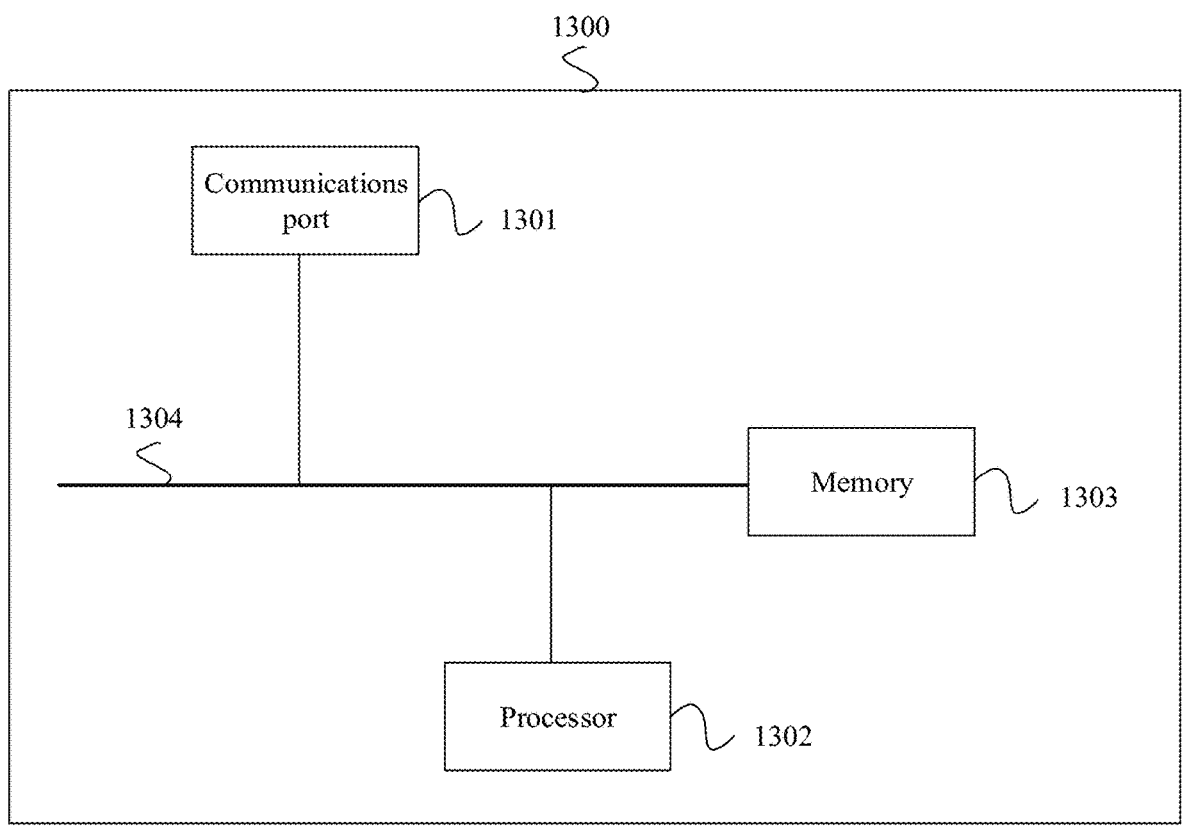
FIG. 13 is a physical block diagram of a chip according to this application.

FIG. 13 is a physical block diagram of a chip according to this application. The chip 1300 may be used for a terminal device. As shown in FIG. 13, the chip includes: at least one communications interface 1301, at least one processor 1302, and at least one memory 1303. The communications interface 1301, the processor 1302, and the memory 1303 are connected to each other by using a circuit (or by using a bus in some cases) 1304. The processor 1302 invokes an instruction stored in the memory 1303 to perform the following method: generating OFDM symbols; and sending at least two OFDM symbols to a network device in a first time unit, and sending at least two OFDM symbols to the network device in a second time unit, where phase offsets of the OFDM symbols in the first time unit are equal to phase offsets of the OFDM symbols in the second time unit, the phase offset of a first OFDM symbol in the first time unit is not equal to the phase offset of at least one OFDM symbol other than the first OFDM symbol in the first time unit, and duration of the first time unit is the same as duration of the second time unit.

In an optional implementation, the duration of the first time unit is duration of a slot corresponding to a subcarrier spacing of 15 kHz.

In an optional implementation, the duration of the first time unit is duration of a subframe.

In an optional implementation, the duration of the first time unit is a symbol length corresponding to a subcarrier spacing of 15 kHz.

In an optional implementation, when a subcarrier spacing of the OFDM symbols in the first time unit is 30 kHz, a quantity of the OFDM symbols in the first time unit is 2.

In an optional implementation, when a subcarrier spacing of the OFDM symbols in the first time unit is 60 kHz, a quantity of the OFDM symbols in the first time unit is 4.

In an optional implementation, the phase offset is a difference between a phase of a first time-domain sampling value at a first sampling time point when a first subcarrier mapping mode is used for an OFDM symbol and a phase of a second time-domain sampling value at the first sampling time point when a second subcarrier mapping mode is used for the same OFDM symbol.

In the first subcarrier mapping mode, a subcarrier center is mapped to a carrier frequency, and in the second subcarrier mapping mode, the subcarrier center is mapped to a frequency that has a preset offset value with a carrier frequency.

In an optional implementation, the preset offset value is 7.5 kHz.

Figure 14:
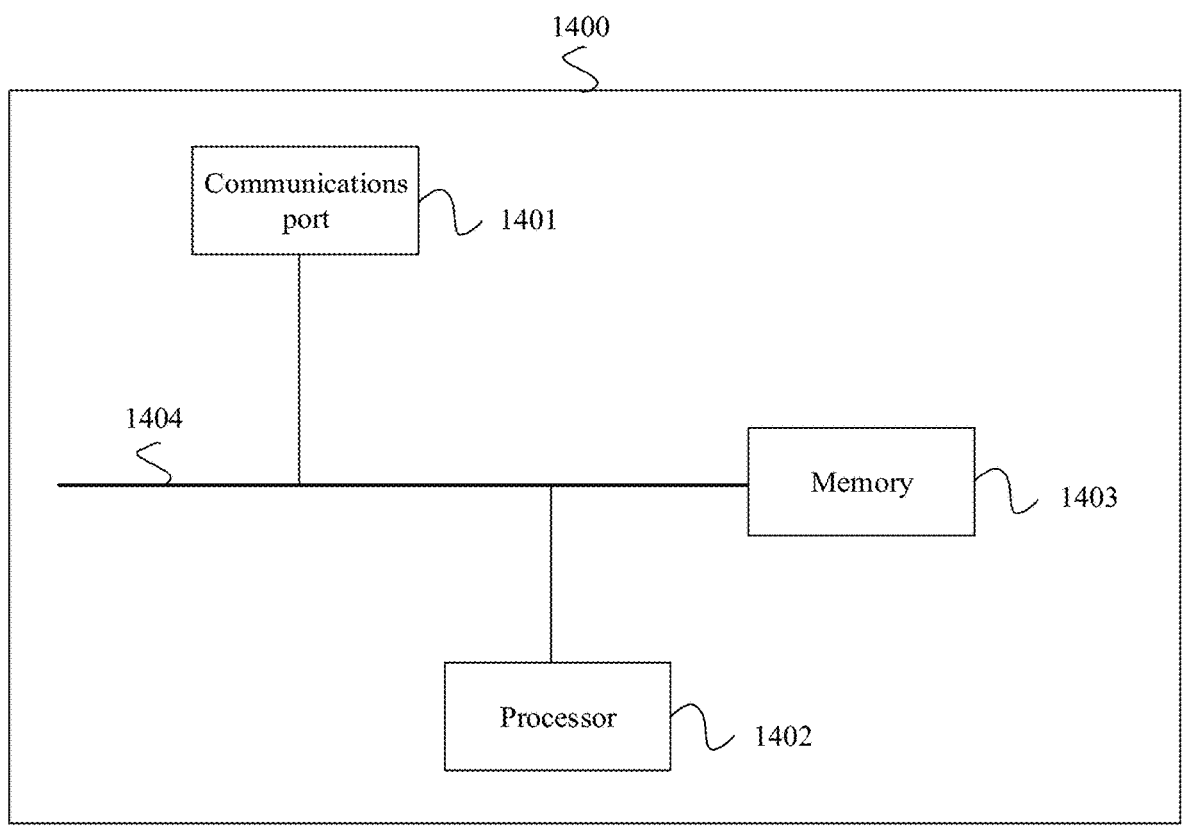
FIG. 14 is a physical block diagram of another chip according to this application.

FIG. 14 is a physical block diagram of another chip according to this application. The chip 1400 may be used for a network device. As shown in FIG. 14, the chip includes: at least one communications interface 1401, at least one processor 1402, and at least one memory 1403. The communications interface 1401, the processor 1402, and the memory 1403 are connected to each other by using a circuit (or by using a bus in some cases) 1404. The processor 1402 invokes an instruction stored in the memory 1403 to perform the following method: receiving at least two OFDM symbols from a terminal device in a first time unit, and receiving at least two OFDM symbols in a second time unit, where phase offsets of the OFDM symbols in the first time unit are equal to phase offsets of the OFDM symbols in the second time unit, the phase offset of a first OFDM symbol in the first time unit is not equal to the phase offset of at least one OFDM symbol other than the first OFDM symbol in the first time unit, and duration of the first time unit is the same as duration of the second time unit; and demodulating the at least two OFDM symbols received in the first time unit and the at least two OFDM symbols received in the second time unit.

In an optional implementation, the duration of the first time unit is duration of a slot corresponding to a subcarrier spacing of 15 kHz.

In an optional implementation, the duration of the first time unit is duration of a subframe.

In an optional implementation, the duration of the first time unit is a symbol length corresponding to a subcarrier spacing of 15 kHz.

In an optional implementation, when a subcarrier spacing of the OFDM symbols in the first time unit is 30 kHz, a quantity of the OFDM symbols in the first time unit is 2.

In an optional implementation, when a subcarrier spacing of the OFDM symbols in the first time unit is 60 kHz, a quantity of the OFDM symbols in the first time unit is 4.

In an optional implementation, the phase offset is a difference between a phase of a first time-domain sampling value at a first sampling time point when a first subcarrier mapping mode is used for an OFDM symbol and a phase of a second time-domain sampling value at the first sampling time point when a second subcarrier mapping mode is used for the same OFDM symbol.

In the first subcarrier mapping mode, a subcarrier center is mapped to a carrier frequency, and in the second subcarrier mapping mode, the subcarrier center is mapped to a frequency that has a preset offset value with a carrier frequency.

In an optional implementation, the preset offset value is 7.5 kHz.

Figure 15:
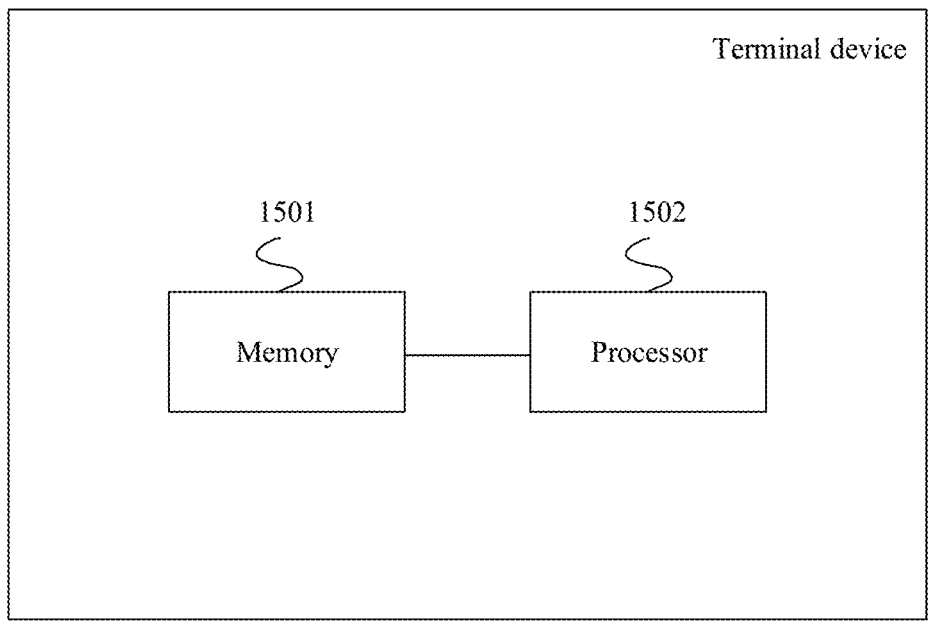
FIG. 15 is a physical block diagram of Embodiment 1 of a terminal device according to this application.

FIG. 15 is a physical block diagram of Embodiment 1 of a terminal device according to this application. As shown in FIG. 15, the terminal device includes: a memory 1501 and a processor 1502.

The memory 1501 is configured to store a program instruction, and the processor 1502 is configured to invoke the program instruction in the memory 1501 to implement a function of the terminal device in the foregoing method embodiment.

Figure 16:
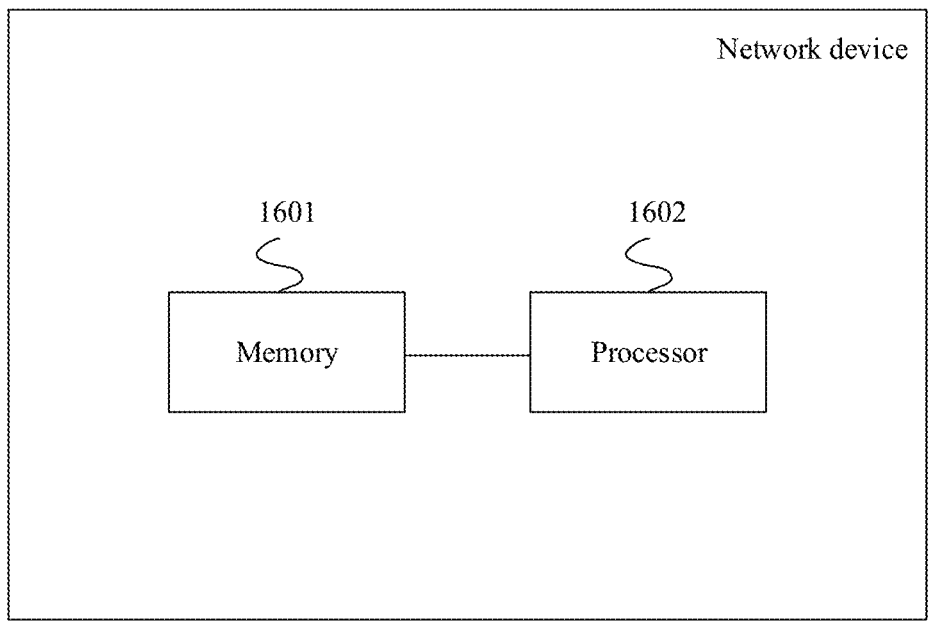
FIG. 16 is a physical block diagram of Embodiment 1 of a network device according to this application.

FIG. 16 is a physical block diagram of Embodiment 1 of a network device according to this application. As shown in FIG. 16, the network device includes: a memory 1601 and a processor 1602.

The memory 1601 is configured to store a program instruction, and the processor 1602 is configured to invoke the program instruction in the memory 1601 to implement a function of the network device in the foregoing method embodiment.

In addition to the problem described in the foregoing embodiments, during uplink signal transmission, because uplink signals determined by the terminal device by using different reference frequencies correspond to different phase offsets, signal interference may occur. During downlink signal transmission, because a reference frequency used by the network device to send a downlink signal may be different from a reference frequency used by the terminal device to receive the downlink signal, the terminal device may incorrectly receive the downlink signal. These problems may be further resolved by using a method provided in the following embodiment of this application.

Figure 17:
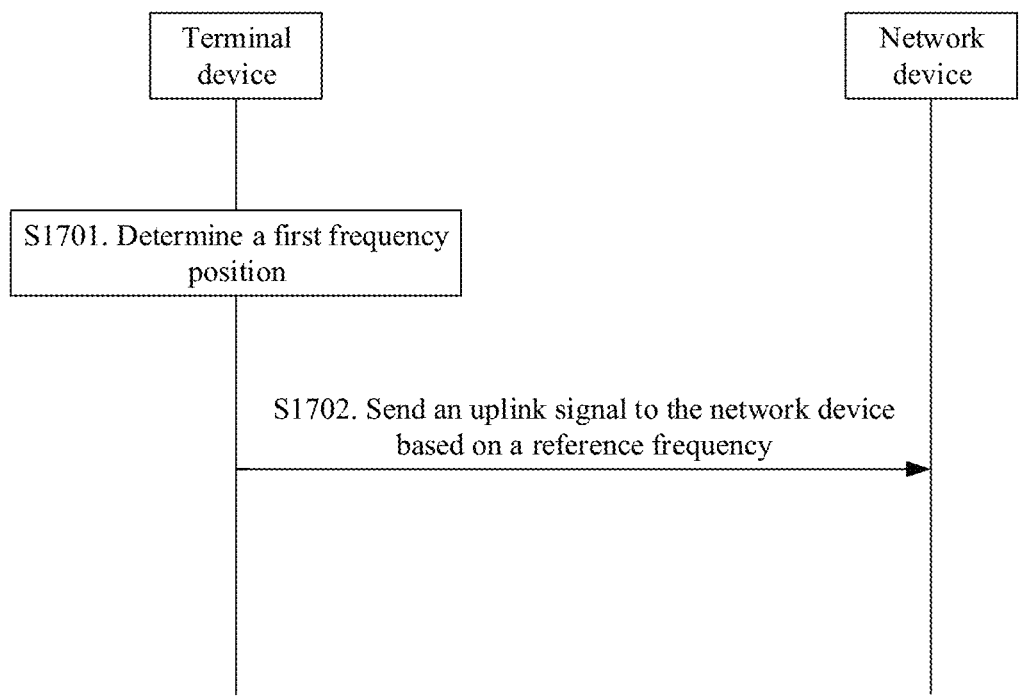
FIG. 17 is a schematic flowchart of another signal sending and receiving method according to this application.

FIG. 17 is a schematic flowchart of another signal sending and receiving method according to this application. The method is used in uplink signal transmission. As shown in FIG. 17, the method includes the following steps.

S1701. A terminal device determines a first frequency position, where the first frequency position is used by the terminal device to determine a reference frequency of an uplink signal.

S1702. The terminal device sends the uplink signal to a network device based on the reference frequency.

Optionally, the terminal device determines the first frequency position according to a pre-defined rule. The first frequency position is pre-defined. In an example, the first frequency position is a center frequency of a subcarrier numbered Y in a frequency domain resource block numbered X, where X and Y may be positive integers or may be 0. Values of X and Y are not limited herein. Optionally, X=0 and Y=0. In other words, the first frequency position is a center frequency of a subcarrier numbered 0 in a frequency domain resource block numbered 0. It should be noted that the number of the frequency domain resource block herein may be a number of the frequency domain resource block in a bandwidth part, or may be a number in a carrier bandwidth. The carrier bandwidth may be a bandwidth of a working carrier of the terminal device, or may be a carrier bandwidth notified by the network device to the terminal device, for example, a bandwidth that is of the working carrier of the network device and that is determined by the terminal device, or may certainly be another type of bandwidth. This is not limited herein. The number of the frequency domain resource block herein may alternatively be a number in a common resource block. The common resource block may be one or more pre-defined resource blocks.

Optionally, the terminal determines the first frequency position based on indication information received from the network device. The indication information indicates the first frequency position. In an example, the indication information indicates a common reference point in frequency domain, so that the first frequency position is a frequency at which the common reference point is located. The common reference point may be a reference point of a resource block grid. For example, the common reference point is an origin of the resource block grid. A resource block position may be determined based on the common reference point. In addition, the common reference point may be a common reference point of a plurality of terminal devices in a cell. A resource block corresponding to the common reference point may be considered as a common resource block. Optionally, the indication information is carried in a system message or radio resource control (RRC) layer signaling, and is sent by the network device to the terminal device. Specifically, the indication information may indicate an absolute radio frequency channel number (absolute radio frequency channel number, ARFCN) corresponding to the common reference point. Values of the ARFCN may include 0 and a positive integer, and different values of the ARFCN correspond to different frequencies. For example, a value range of the ARFCN in a new radio system is 0 to 3279165. 0 corresponds to 0 Hz, 1 corresponds to 5 kHz, 2 corresponds to 10 kHz, and so on. The terminal device may determine, based on a value that is of the ARFCN and that is indicated in the indication information, a frequency corresponding to the common reference point. Specifically, the common reference point may be a reference point A defined in the new radio system.

Optionally, the frequency at which the common reference point is located is a modulation frequency of an uplink baseband signal corresponding to the uplink signal. The modulation frequency herein may be a frequency used for performing up-conversion on the uplink baseband signal or other processing (for example, performing modulation or frequency shifting on a signal).

In an example, the indication information may indicate a subcarrier numbered Y in a frequency domain resource block numbered X, or indicate a center frequency of a subcarrier numbered Y in a frequency domain resource block numbered X. X and Y may be positive integers, or may be 0. Values of X and Y are not limited herein. Optionally, the indication information can indicate, in the frequency domain resource block numbered X, only a subcarrier numbered 0, a subcarrier numbered 6, or a subcarrier numbered 0 or 6. In this way, a quantity of bits required by the indication information can be reduced, and indication overheads can be reduced.

In another example, the indication information may indicate only a frequency domain resource block numbered X, and the terminal device determines, according to the pre-defined rule, a subcarrier numbered Y. For example, a value of Y is fixed to 0, or is fixed to 6, or is another value. In this manner, signaling overheads can be reduced.

In another example, the indication information indirectly indicates the first frequency position. For example, the indication information indicates an offset value, where the offset value is an offset of the first frequency position relative to a second frequency position, and the second frequency position is a pre-defined position. For example, the second frequency position is a center frequency of a subcarrier numbered Y in the frequency domain resource block numbered X. X and Y may be positive integers, or may be 0. Values of X and Y are not limited herein. Optionally, X=0 and Y=0. In other words, the first frequency position is a center frequency of a subcarrier numbered 0 in a frequency domain resource block numbered 0. The offset value may be in a unit of subcarrier, in a unit of resource block, or in a unit of frequency. For example, a frequency corresponding to the second frequency position is f1. When the offset indicated by the indication information is N1 subcarriers, and a subcarrier spacing corresponding to the subcarrier is u, a frequency corresponding to the first frequency position is f0=f1+N1×u, or may be f0=f1−N1×u. For another example, the frequency corresponding to the second frequency position is f1. When the offset indicated by the indication information is N2 subcarriers, and a subcarrier spacing corresponding to the subcarrier is u, the frequency corresponding to the first frequency position is f0=f1+N2×12×u, or may be f0=f1+N2×12×u−u. It should be noted that "12" is a specific example of a quantity of subcarriers in a resource block. The value may alternatively be replaced with another value such as 24 based on different network types. In an example, the frequency corresponding to the second frequency position is f1. When the offset indicated by the indication information is f2, the frequency corresponding to the first frequency position is f0=f1+f2, or may be f0=f1−f2. The foregoing is merely an example, and does not limit the method. For example, the first reference frequency is a radio frequency reference frequency. The radio frequency reference frequency may be a center frequency of a radio frequency bandwidth. A second reference frequency is the frequency at which the common reference point is located, for example, the foregoing reference point A.

Optionally, the uplink signal includes at least one of an uplink data signal, an uplink control signal, an uplink access signal, or an uplink reference signal. The uplink data signal may be a physical uplink shared channel or a signal having a same function and a different name. The uplink control signal may be a physical uplink control channel or a signal having a same function and a different name. The uplink access signal may be a physical random access signal or a signal having a same function and a different name. The uplink reference signal may be a demodulation reference signal, a sounding reference signal, or the like.

Optionally, the terminal device may determine that a frequency corresponding to the first frequency position is the reference frequency, or may determine the reference frequency based on the first frequency position and a quantity of first resource blocks. The quantity of first resource blocks may be determined by the terminal device in advance, or may be notified by the network device. This is not limited herein. For example, the first frequency position is f1, the quantity of first resource blocks is N, and a subcarrier spacing corresponding to the quantity of first resource blocks is u. In this case, the reference frequency f0 may be f0=f1+N/2×12×u, or may be f0=f1+N/2×12×u−u, or certainly may be another value. This is not limited herein.

Optionally, the reference frequency may be a center frequency of a radio frequency bandwidth of the terminal device, or may be a center frequency of a direct current subcarrier. The direct current subcarrier may be understood as a subcarrier with a frequency of 0 in a baseband signal, and the reference frequency may alternatively be a center frequency of an OFDM symbol generated by the terminal device, or certainly may be another frequency.

Specifically, the reference frequency may alternatively be a radio frequency reference frequency. In an example, the radio frequency reference frequency is the same as a frequency position at which a center subcarrier of the terminal device is located, and the center subcarrier may be a center subcarrier in the carrier bandwidth. The center subcarrier may be understood as: There are Z frequency domain resource blocks numbered from 0 to Z−1 in the carrier bandwidth, there are n subcarriers in each frequency domain resource block, and the subcarriers in each frequency domain resource block are numbered from 0 to n−1. Therefore, there are a total of Z×n subcarriers in the carrier bandwidth, and numbers of the subcarriers may be from 0 to Z×n−1. Therefore, the center subcarrier in the carrier bandwidth is a subcarrier numbered Z×n/2 or a subcarrier numbered (Z×n−1)/2. For example, there are 11 frequency domain resource blocks numbered from 0 to 10 in the carrier bandwidth, and there are 12 subcarriers numbered from 0 to 11 in each frequency domain resource block. In this case, the center subcarrier in the carrier bandwidth is the subcarrier numbered 6 in the frequency domain resource block numbered 5, or may be a subcarrier numbered 66 in the 11 frequency domain resource blocks. For another example, there are 12 frequency domain resource blocks numbered from 0 to 11 in the carrier bandwidth, and there are 12 subcarriers numbered from 0 to 11 in each frequency domain resource block. In this case, the center subcarrier in the carrier bandwidth is the subcarrier numbered 0 in the frequency domain resource block numbered 6, or may be a subcarrier numbered 72 in the 12 frequency domain resource blocks. The quantity Z of the frequency domain resource blocks in the carrier bandwidth may be a pre-specified value, for example, a maximum value that is of a quantity of resource blocks corresponding to the carrier bandwidth and that is specified in a protocol, or may be a value determined by the network device, or may be a value notified by the network device to the terminal device. This is not limited herein. It should be noted that, when only a first subcarrier spacing is configured for the carrier bandwidth, the first subcarrier spacing may be 15 kHz, 30 kHz, or another value, and the radio frequency reference frequency is a frequency at which a center subcarrier of a frequency domain resource block corresponding to the first subcarrier spacing is located. When more than one subcarrier spacing is configured for the carrier bandwidth, the radio frequency reference frequency is a frequency at which a center subcarrier of a frequency domain resource block corresponding to a smallest subcarrier spacing in the more than one subcarrier spacing is located. For example, when a subcarrier spacing of 15 kHz and a subcarrier spacing of 30 kHz are configured for the carrier bandwidth, the radio frequency reference frequency is a frequency at which a center subcarrier of a frequency domain resource block corresponding to 15 kHz is located. When more than one subcarrier spacing is configured for the carrier bandwidth, the radio frequency reference frequency is a frequency at which a center subcarrier of a frequency domain resource block corresponding to a target subcarrier spacing in the more than one subcarrier spacing is located. The target subcarrier spacing is the subcarrier spacing notified by the network device to the terminal device. The target subcarrier spacing is a subcarrier spacing that is configured by the network device for the terminal and that is used to determine the radio frequency reference frequency. For example, when a subcarrier spacing of 15 kHz and a subcarrier spacing of 30 kHz are configured for the carrier bandwidth, the target subcarrier spacing notified by the network device to the terminal device may be 15 kHz or 30 kHz. In this case, the terminal device determines the radio frequency reference frequency based on the notified target subcarrier spacing.

Optionally, the terminal device may determine the uplink baseband signal based on the reference frequency. For example, the terminal device may determine a phase or phase offset of the uplink baseband signal based on the reference frequency. Then, the terminal device determines the uplink signal based on the uplink baseband signal.

Optionally, the phase of the uplink baseband signal is determined based on a first frequency and a center of a bandwidth part of the terminal device. For example, an uplink baseband signal $s_l^{(p,\mu)}(t)$ may be $$s_l^{(p,\mu)}(t) = \sum_{k=0}^{N} a_k e^{j2\pi t \cdot g(f_0, f_1)},$$

where $f_0$ is the first frequency, $f_1$ is a center frequency of the bandwidth part, and $g(f_0,f_1)$ should be understood as a function of $f_0$ and $f_1$. Specifically, assuming that the reference frequency is f0, the phase of the uplink baseband signal may be calculated by using a formula $e^{j2\pi f_0 t}$ or $2\pi f_0 t$. The uplink baseband signal is up-converted to the reference frequency, to obtain a signal. For example, the uplink baseband signal is $s_l^{(p,\mu)}(t)$. In this case, an uplink signal obtained through up-conversion may be $Re\{s_l^{(p,\mu)}(t) \cdot e^{j2\pi f_0 t}\}$, where Re{ } is a real part of a complex number.

Optionally, the terminal device determines the uplink baseband signal based on the reference frequency, and then performs up-conversion on the uplink baseband signal based on the reference frequency, to determine the uplink signal. In an example, the terminal device determines the uplink baseband signal based on one of the following formulas:

$$s_l^{(p,\mu)}(t) = \sum_{k=0}^{N_{grid}^{size,\mu} N_{sc}^{RB}-1} a_{k,l}^{(p,\mu)} \cdot e^{j2\pi(k+N_{grid}^{start,\mu} N_{sc}^{RB})\Delta f(t-N_{CP,l}^{\mu} T_c - t_{start,l}^{\mu})}, \text{ or}$$

$$s_l^{(p,\mu)}(t) = \sum_{k=N_{grid}^{start,\mu} N_{sc}^{RB}}^{N_{grid}^{start,\mu} N_{sc}^{RB} + N_{grid}^{size,\mu} N_{sc}^{RB}-1} a_{k,l}^{(p,\mu)} \cdot e^{j2\pi k \Delta f(t-N_{CP,l}^{\mu} T_c - t_{start,l}^{\mu})}, \text{ or}$$

$$s_l^{(p,\mu)}(t) = \sum_{k=N_{grid}^{start,\mu} N_{sc}^{RB}}^{N_{grid}^{start,\mu} N_{sc}^{RB} + N_{grid}^{size,\mu} N_{sc}^{RB}-1} a_{k-N_{grid}^{start,\mu} N_{sc}^{RB},l}^{(p,\mu)} \cdot e^{j2\pi k \Delta f(t-N_{CP,l}^{\mu} T_c - t_{start,l}^{\mu})}$$

where $s_l^{(p,\mu)}(t)$ represents a signal corresponding to an antenna port p and a subcarrier spacing configuration μ; $a_{k,l}^{(p,\mu)}$ represents a complex number value; l represents an $l^{th}$ OFDM symbol in a subframe; $N_{CP,l}^{\mu}$ is a quantity of sampling time points in a CP of the $l^{th}$ OFDM symbol; t represents a sampling time point; $T_c$ represents a time unit value; Δf represents a subcarrier spacing, where a correspondence between Δf and μ is Δf=$2^{\mu}$·15 kHz; $N_{grid}^{size,\mu}$ represents a quantity of resource blocks; $N_{grid}^{start,\mu}$ represents a sequence number of a resource block that is in a common resource block and whose subcarrier spacing configuration is μ, and may be notified by a base station to the terminal device; $N_{sc}^{RB}$ represents a quantity of subcarriers in a resource block; k represents a sequence number of a subcarrier; and $t_{start,l}^{\mu}$ represents a start point of the $l^{th}$ OFDM symbol. It should be noted that the foregoing formula may also be expressed in one of the following forms:

$$s_l^{(p,\mu)}(t) = \sum_{k=0}^{N_{grid}^{size,\mu} N_{sc}^{RB}-1} a_{k,l}^{(p,\mu)} \cdot e^{j2\pi(k+X)\Delta f(t-N_{CP,l}^{\mu} T_c - t_{start,l}^{\mu})}, \text{ or}$$

$$s_l^{(p,\mu)}(t) = \sum_{k=X}^{X+N_{grid}^{size,\mu} N_{sc}^{RB}-1} a_{k,l}^{(p,\mu)} \cdot e^{j2\pi k \Delta f(t-N_{CP,l}^{\mu} T_c - t_{start,l}^{\mu})}, \text{ or}$$

$$s_l^{(p,\mu)}(t) = \sum_{k=X}^{X+N_{grid}^{size,\mu} N_{sc}^{RB}-1} a_{k-X,l}^{(p,\mu)} \cdot e^{j2\pi k \Delta f(t-N_{CP,l}^{\mu} T_c - t_{start,l}^{\mu})},$$

where X may be a value related to $N_{grid}^{start,\mu}$. X may alternatively be a value notified by the network device to the terminal device. For example, the network device may directly notify the terminal device of a value of X, or may notify the terminal device of a value of X·Δf. For another example, the network device may indirectly notify the terminal device of a value of X, for example, notify the terminal device of a parameter X1 related to X, and the terminal device determines X based on X1.

Further, optionally, the terminal device performs up-conversion on $s_l^{(p,\mu)}(t)$ based on the following formula:

$$Re\{s_l^{(p,\mu)}(t) \cdot e^{j2\pi f_0(t-t_{start,l}^\mu - N_{CP,l}^\mu T_c)}\},$$

where $f_0$ is the reference frequency.

Optionally, when the uplink signal is a random access signal, the terminal device determines the random access signal based on the following formula:

$$s_l^{(p,\mu)}(t) = \sum_{k=0}^{L_{RA}-1} a_k^{(p,RA)} \cdot e^{j2\pi(k+Kk_1+\bar{k})\Delta f_{RA}(t-N_{CP,l}^{RA}T_c - t_{start}^{RA})}$$

$$K = \Delta f / \Delta f_{RA}$$

$$k_1 = N_{BWP,i}^{start} N_{sc}^{RB} + n_{RA}^{start} N_{sc}^{RB} + n_{RA} N_{RB}^{RA} N_{sc}^{RB} + N_{grid}^{start,\mu} N_{sc}^{RB}$$

where $N_{BWP,i}^{start}$ is a number of a resource block that has a smallest number in an initially activated uplink bandwidth part and that is in a common resource block, $n_{RA}^{start}$ is a frequency offset, $n_{RA}$ is a frequency domain number of a random access signal transmission opportunity, $N_{RB}^{RA}$ is a quantity of occupied resource blocks, and definitions of other parameters are the same as definitions of the parameters in 3GPP 38.211.

It should be noted that a form of the foregoing formula may be changed, and any formula equivalent to the foregoing formula falls within the protection scope of the present invention.

In this embodiment, because uplink signals determined by the terminal device by using different reference frequencies correspond to different phase offsets, interference occurs between signals (for example, reference signals) of a plurality of terminal devices using spatial multiplexing. Consequently, performance losses are caused. According to the method in this embodiment, different terminal devices can send uplink signals by using a same reference frequency, to ensure that when spatial multiplexing is performed on these terminal devices, reference signals can keep orthogonal, to avoid performance losses.

Figure 18:
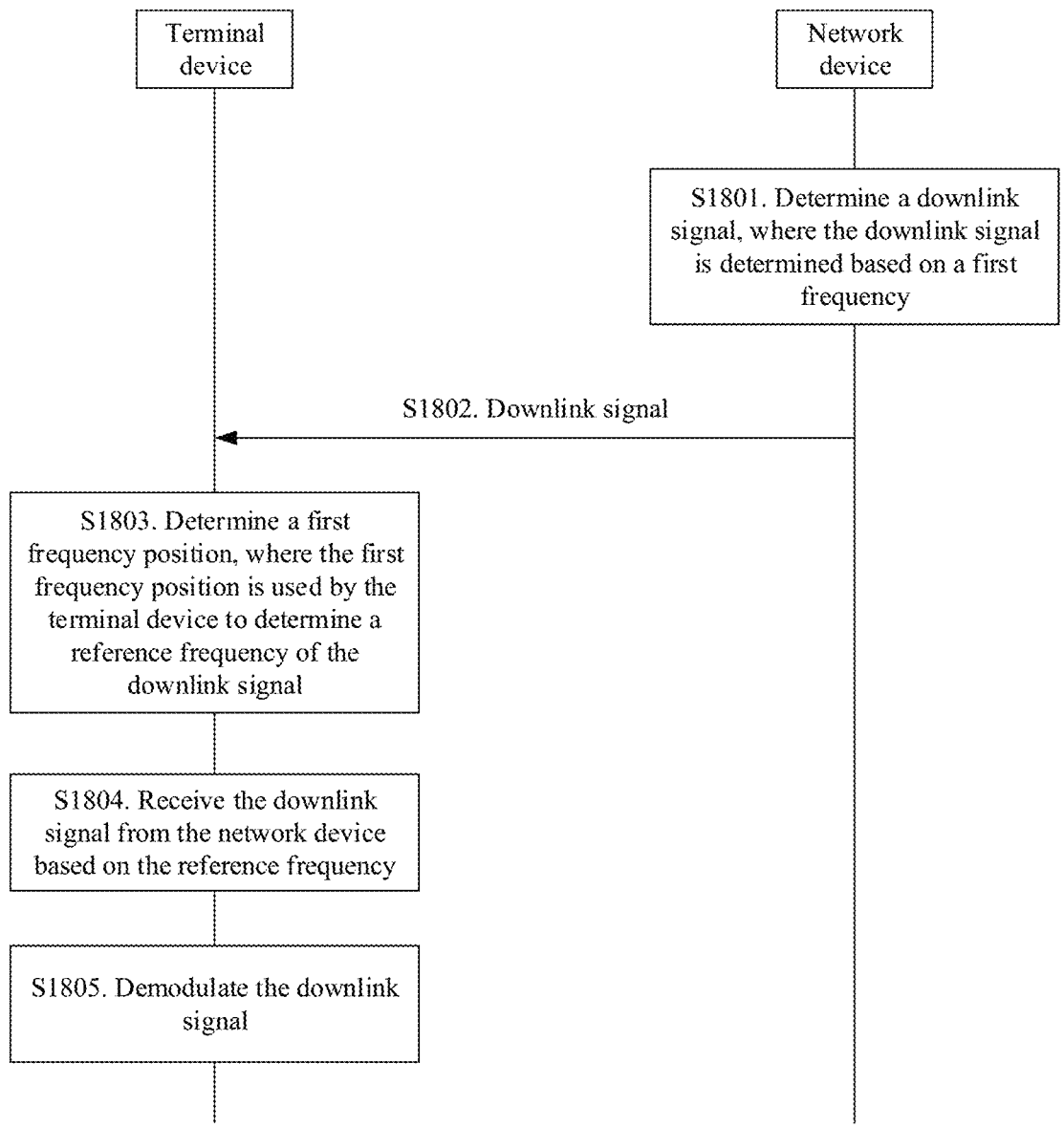
FIG. 18 is a schematic flowchart of still another signal sending and receiving method according to this application.

FIG. 18 is a schematic flowchart of still another signal sending and receiving method according to this application. The method is used in downlink signal transmission. As shown in FIG. 18, the method includes the following steps.

S1801. A network device determines a downlink signal, where the downlink signal is determined based on a first frequency.

S1802. The network device sends the downlink signal to a terminal device.

Optionally, the network device sends indication information to the terminal device, where the indication information is used to indicate the first frequency.

Optionally, the first frequency is a carrier frequency.

Optionally, the downlink signal is a signal obtained after the network device up-converts a downlink baseband signal to the carrier frequency. For example, the downlink baseband signal is $s_l^{(p,\mu)}(t)$. In this case, the signal obtained through up-conversion may be $Re\{s_l^{(p,\mu)}(t) \cdot e^{j2\pi f_0 t}\}$, where the first frequency is $f_0$, and $Re\{\}$ is a real part of a complex number. In an example, the network device determines the downlink baseband signal based on one of the following formulas:

$$s_l^{(p,\mu)}(t) = \sum_{k=0}^{N_{grid}^{size,\mu} N_{sc}^{RB}-1} a_{k,l}^{(p,\mu)} \cdot e^{j2\pi(k+N_{grid}^{start,\mu} N_{sc}^{RB})\Delta f(t-N_{CP,l}^\mu T_c - t_{start,l}^\mu)}, \text{ or}$$

$$s_l^{(p,\mu)}(t) = \sum_{k=N_{grid}^{start,\mu} N_{sc}^{RB}}^{N_{grid}^{start,\mu} N_{sc}^{RB}+N_{grid}^{size,\mu} N_{sc}^{RB}-1} a_{k,l}^{(p,\mu)} \cdot e^{j2\pi k \Delta f(t-N_{CP,l}^\mu T_c - t_{start,l}^\mu)}, \text{ or}$$

$$s_l^{(p,\mu)}(t) = \sum_{k=N_{grid}^{start,\mu} N_{sc}^{RB}}^{N_{grid}^{start,\mu} N_{sc}^{RB}+N_{grid}^{size,\mu} N_{sc}^{RB}-1} a_{k-N_{grid}^{start,\mu} N_{sc}^{RB},l}^{(p,\mu)} \cdot e^{j2\pi k \Delta f(t-N_{CP,l}^\mu T_c - t_{start,l}^\mu)},$$

where $s_l^{(p,\mu)}(t)$ represents a signal corresponding to an antenna port p and a subcarrier spacing configuration $\mu$; $a_{k,l}^{(p,\mu)}$ represents a complex number value; l represents an $l^{th}$ OFDM symbol in a subframe; $N_{CP,l}^\mu$ is a quantity of sampling time points in a CP of the $l^{th}$ OFDM symbol; t represents a sampling time point; $T_c$ represents a time unit value; $\Delta f$ represents a subcarrier spacing, where a correspondence between $\Delta f$ and $\mu$ is $\Delta f = 2^\mu \cdot 15$ kHz; $N_{grid}^{size,\mu}$ represents a quantity of resource blocks; $N_{grid}^{start,\mu}$ represents a sequence number of a resource block that is in a common resource block and whose subcarrier spacing configuration is $\mu$, and may be notified by a base station to the terminal device; $N_{sc}^{RB}$ represents a quantity of subcarriers in a resource block; k represents a sequence number of a subcarrier; and $t_{start,l}^\mu$ represents a start point of the $l^{th}$ OFDM symbol. It should be noted that the foregoing formula may also be expressed in one of the following forms:

$$s_l^{(p,\mu)}(t) = \sum_{k=0}^{N_{grid}^{size,\mu} N_{sc}^{RB}-1} a_{k,l}^{(p,\mu)} \cdot e^{j2\pi(k+X)\Delta f(t-N_{CP,l}^\mu T_c - t_{start,l}^\mu)}, \text{ or}$$

$$s_l^{(p,\mu)}(t) = \sum_{k=X}^{X+N_{grid}^{size,\mu} N_{sc}^{RB}-1} a_{k,l}^{(p,\mu)} \cdot e^{j2\pi k \Delta f(t-N_{CP,l}^\mu T_c - t_{start,l}^\mu)}, \text{ or}$$

$$s_l^{(p,\mu)}(t) = \sum_{k=X}^{X+N_{grid}^{size,\mu} N_{sc}^{RB}-1} a_{k-X,l}^{(p,\mu)} \cdot e^{j2\pi k \Delta f(t-N_{CP,l}^\mu T_c - t_{start,l}^\mu)},$$

where X may be an integer value related to $N_{grid}^{start,\mu}$. X may alternatively be a value notified by the network device to the terminal device. For example, the network device may directly notify the terminal device of a value of X, or may notify the terminal device of a value of X·$\Delta f$. For another example, the network device may indirectly notify the terminal device of a value of X, for example, notify the terminal device of a parameter X1 related to X, and the terminal device determines X based on X1.

Further, optionally, the terminal device performs up-conversion on $s_l^{(p,\mu)}(t)$ based on the following formula:

$$Re\{s_l^{(p,\mu)}(t) \cdot e^{j2\pi f_0(t-t_{start,l}^\mu - N_{CP,l}^\mu T_c)}\}$$

where f0 is the reference frequency.

It should be noted that a form of the foregoing formula may be changed, and any formula equivalent to the foregoing formula falls within the protection scope of the present invention.

Optionally, the downlink baseband signal is determined based on the first frequency. Specifically, a phase of the downlink baseband signal is determined based on the first frequency. In addition to the first frequency, factors that affect the downlink baseband signal further include a subcarrier spacing, a bandwidth, and the like, and are not listed one by one in this application.

Optionally, the downlink baseband signal is determined based on a center frequency position of a bandwidth part of the terminal device. Specifically, the phase of the downlink baseband signal is determined based on the center frequency position of the bandwidth part of the terminal device.

Optionally, the phase of the downlink baseband signal is determined based on the first frequency and the center frequency of the bandwidth part of the terminal device. For example, the downlink baseband signal $s_l^{(p,\mu)}(t)$ may be $$s_l^{(p,\mu)}(t) = \sum_{k=0}^{N} a_k e^{j2\pi t \cdot g(f_0, f_1)},$$

where $f_0$ is the first frequency, $f_1$ is the center frequency of the bandwidth part, and $g(f_0, f_1)$ should be understood as a function of $f_0$ and $f_1$.

Optionally, the phase of the downlink baseband signal is determined based on a difference between the first frequency and the center frequency of the bandwidth part of the terminal device. For example, the downlink baseband signal $s_l^{(p,\mu)}(t)$ may be $$s_l^{(p,\mu)}(t) = \sum_{k=0}^{N} a_k e^{j2\pi t \cdot g(f_0 - f_1)},$$

where $f_0$ is the first frequency, $f_1$ is the center frequency of the bandwidth part, and $g(f_0-f_1)$ should be understood as a function of $f_0-f_1$.

S1803. The terminal device determines a first frequency position, where the first frequency position is used by the terminal device to determine a reference frequency of the downlink signal.

S1804. The terminal device receives the downlink signal from the network device based on the reference frequency.

Optionally, this embodiment further includes S1805: The terminal device demodulates the downlink signal.

Optionally, the terminal device determines the first frequency position according to a pre-defined rule. In an example, the first frequency position is a center frequency of a subcarrier numbered Y in a frequency domain resource block numbered X, where X and Y may be positive integers or may be 0. Values of X and Y are not limited herein. Optionally, X=0 and Y=0. In other words, the first frequency position is a center frequency of a subcarrier numbered 0 in a frequency domain resource block numbered 0. It should be noted that the number of the frequency domain resource block herein may be a number of the frequency domain resource block in the bandwidth part, or may be a number in a carrier bandwidth. The carrier bandwidth may be a bandwidth of a working carrier of the terminal device, or may be a carrier bandwidth notified by the network device to the terminal device, for example, a bandwidth that is of the working carrier of the network device and that is determined by the terminal device, or may certainly be another type of bandwidth. This is not limited herein. The number of the frequency domain resource block herein may alternatively be a number in a common resource block. The common resource block may be one or more pre-defined resource blocks.

Optionally, the terminal device determines the first frequency position based on the indication information received from the network device, where the indication information indicates the first frequency position. In an example, the indication information indicates a common reference point in frequency domain, so that the first frequency position is a frequency at which the common reference point is located. The common reference point may be a reference point of a resource block grid. For example, the common reference point is an origin of the resource block grid. A resource block position may be determined based on the common reference point. In addition, the common reference point may be a common reference point of a plurality of terminal devices in a cell. A resource block corresponding to the common reference point may be considered as a common resource block. Optionally, the indication information is carried in a system message or radio resource control (RRC) layer signaling, and is sent by the network device to the terminal device. Specifically, the indication information may indicate an ARFCN corresponding to the common reference point. Values of the ARFCN may include 0 and a positive integer, and different values of the ARFCN correspond to different frequencies. For example, a value range of the ARFCN in a new radio system is 0 to 3279165. 0 corresponds to 0 Hz, 1 corresponds to 5 kHz, 2 corresponds to 10 kHz, and so on. The terminal device may determine, based on a value that is of the ARFCN and that is indicated in the indication information, a frequency corresponding to the common reference point. Specifically, the common reference point may be a reference point A defined in the new radio system. The reference point A may be considered as the common reference point of the resource block grid.

In an example, the indication information may indicate a subcarrier numbered Y in a frequency domain resource block numbered X, or indicate a center frequency of a subcarrier numbered Y in a frequency domain resource block numbered X, where X and Y may be positive integers, or may be 0. Values of X and Y are not limited herein. Optionally, the indication information can indicate, in the frequency domain resource block numbered X, only a subcarrier numbered 0, a subcarrier numbered 6, or a subcarrier numbered 0 or 6. In this way, a quantity of bits required by the indication information can be reduced, and indication overheads can be reduced.

In another example, the indication information may indicate only a frequency domain resource block numbered X, and the terminal device determines, according to the pre-defined rule, a subcarrier numbered Y. For example, a value of Y is fixed to 0, or is fixed to 6, or is another value. In this manner, signaling overheads can be reduced.

In another example, the indication information indirectly indicates the first frequency position. For example, the indication information indicates an offset value, where the offset value is an offset of the first frequency position relative to a second frequency position, and the second frequency position is a pre-defined position. For example, the second frequency position is a center frequency of a subcarrier numbered Y in the frequency domain resource block numbered X. X and Y may be positive integers, or may be 0. Values of X and Y are not limited herein. Optionally, X=0 and Y=0. In other words, the first frequency position is a center frequency of a subcarrier numbered 0 in a frequency domain resource block numbered 0. The offset value may be in a unit of subcarrier, in a unit of resource block, or in a unit of frequency. For example, a frequency corresponding to the second frequency position is f1. When the offset indicated by the indication information is N1 subcarriers, and a subcarrier spacing corresponding to the subcarrier is u, a frequency corresponding to the first frequency position is f0=f1+N1×u, or may be f0=f1−N1×u. For another example, the frequency corresponding to the second frequency position is f1. When the offset indicated by the indication information is N2 subcarriers, and a subcarrier spacing corresponding to the subcarrier is u, the frequency corresponding to the first frequency position is f0=f1+N2/2×12×u, or may be f0=f1+N2/2×12×u−u. It should be noted that "12" is a specific example of a quantity of subcarriers in a resource block. The value may alternatively be replaced with another value based on different network types. In an example, the frequency corresponding to the second frequency position is f1. When the offset indicated by the indication information is f2, the frequency corresponding to the first frequency position is f0=f1+f2, or may be f0=f1−f2. The foregoing is merely an example, and does not limit the method. For example, the first reference frequency is a radio frequency reference frequency. The radio frequency reference frequency may be a center frequency of a radio frequency bandwidth. The second reference frequency is the frequency at which the common reference point is located, for example, the foregoing reference point A.

Optionally, the uplink signal includes at least one of an uplink data signal, an uplink control signal, an uplink access signal, or an uplink reference signal. The uplink data signal may be a physical uplink shared channel or a signal having a same function and a different name. The uplink control signal may be a physical uplink control channel or a signal having a same function and a different name. The uplink access signal may be a physical random access signal or a signal having a same function and a different name. The uplink reference signal may be a demodulation reference signal, a sounding reference signal, or the like.

Optionally, the terminal device may directly determine that a frequency corresponding to the first frequency position is the reference frequency, or may determine the reference frequency based on the first frequency position and a quantity of first resource blocks. The quantity of first resource blocks may be determined by the terminal device in advance, or may be notified by the network device. This is not limited herein. For example, the first frequency position is f1, the quantity of first resource blocks is N, and a subcarrier spacing corresponding to the quantity of first resource blocks is u. In this case, the reference frequency f0 may be f0=f1+N/2×12×u, or may be f0=f1+N/2×12×u−u, or certainly may be another value. This is not limited herein.

Optionally, the downlink signal includes at least one of a downlink data signal, a downlink control signal, a downlink reference signal, a synchronization signal, or a broadcast signal. The downlink data signal may be a physical downlink shared channel or a signal having a same function and a different name. The downlink control signal may be a physical downlink control channel or a signal having a same function and a different name. An uplink access signal may be a physical random access signal or a signal having a same function and a different name. The downlink reference signal may be a demodulation reference signal, a channel state information reference signal, or the like.

Optionally, the reference frequency may be a center frequency of a radio frequency bandwidth of the terminal device, or may be a center frequency of a direct current subcarrier. The direct current subcarrier may be understood as a subcarrier with a frequency of 0 in a baseband signal, and the reference frequency may alternatively be a center frequency of an OFDM symbol received by the terminal device from the network device, or certainly may be another frequency.

Specifically, the reference frequency may alternatively be a radio frequency reference frequency. In an example, the radio frequency reference frequency is the same as a frequency position at which a center subcarrier of the terminal device is located, and the center subcarrier may be a center subcarrier in the carrier bandwidth. The center subcarrier may be understood as: There are Z frequency domain resource blocks numbered from 0 to Z−1 in the carrier bandwidth, there are n subcarriers in each frequency domain resource block, and the subcarriers in each frequency domain resource block are numbered from 0 to n−1. Therefore, there are a total of Z×n subcarriers in the carrier bandwidth, and numbers of the subcarriers may be from 0 to Z×n−1. Therefore, the center subcarrier in the carrier bandwidth is a subcarrier numbered Z×n/2 or a subcarrier numbered (Z×n−1)/2. For example, there are 11 frequency domain resource blocks numbered from 0 to 10 in the carrier bandwidth, and there are 12 subcarriers numbered from 0 to 11 in each frequency domain resource block. In this case, the center subcarrier in the carrier bandwidth is the subcarrier numbered 6 in the frequency domain resource block numbered 5, or may be a subcarrier numbered 66 in the 11 frequency domain resource blocks. For another example, there are 12 frequency domain resource blocks numbered from 0 to 11 in the carrier bandwidth, and there are 12 subcarriers numbered from 0 to 11 in each frequency domain resource block. In this case, the center subcarrier in the carrier bandwidth is the subcarrier numbered 0 in the frequency domain resource block numbered 6, or may be a subcarrier numbered 72 in the 12 frequency domain resource blocks. The quantity Z of the frequency domain resource blocks in the carrier bandwidth may be a pre-specified value, for example, a maximum value that is of a quantity of resource blocks corresponding to the carrier bandwidth and that is specified in a protocol, or may be a value determined by the network device, or may be a value notified by the network device to the terminal device. This is not limited herein. It should be noted that, when only a first subcarrier spacing is configured for the carrier bandwidth, the first subcarrier spacing may be 15 kHz, 30 kHz, or another value, and the radio frequency reference frequency is a frequency at which a center subcarrier of a frequency domain resource block corresponding to the first subcarrier spacing is located. When more than one subcarrier spacing is configured for the carrier bandwidth, the radio frequency reference frequency is a frequency at which a center subcarrier of a frequency resource block corresponding to a smallest subcarrier spacing in the more than one subcarrier spacing is located. For example, when a subcarrier spacing of 15 kHz and a subcarrier spacing of 30 kHz are configured for the carrier bandwidth, the radio frequency reference frequency is a frequency at which a center subcarrier of a frequency domain resource block corresponding to 15 kHz is located. When more than one subcarrier spacing is configured for the carrier bandwidth, the radio frequency reference frequency is a frequency at which a center subcarrier of a frequency domain resource block corresponding to a target subcarrier spacing in the more than one subcarrier spacing is located. The target subcarrier spacing is the subcarrier spacing notified by the network device to the terminal device. The target subcarrier spacing is a subcarrier spacing that is configured by the network device for the terminal and that is used to determine the radio frequency reference frequency. For example, when a subcarrier spacing of 15 kHz and a subcarrier spacing of 30 kHz are configured for the carrier bandwidth, the target subcarrier spacing notified by the network device to the terminal device may be 15 kHz or 30 kHz. In this case, the terminal device determines the radio frequency reference frequency based on the notified target subcarrier spacing.

Optionally, the terminal device may determine the downlink baseband signal based on the reference frequency. For example, the terminal device may determine a phase or phase offset of the downlink baseband signal based on the reference frequency. Previous to this, the terminal device may perform down-conversion based on the phase or phase offset of the downlink signal, to determine the downlink baseband signal.

Optionally, the terminal device may not perform down-conversion on the downlink signal based on the reference frequency, to determine the downlink baseband signal. Then, the terminal device detects the downlink baseband signal based on the reference frequency.

Figure 19:
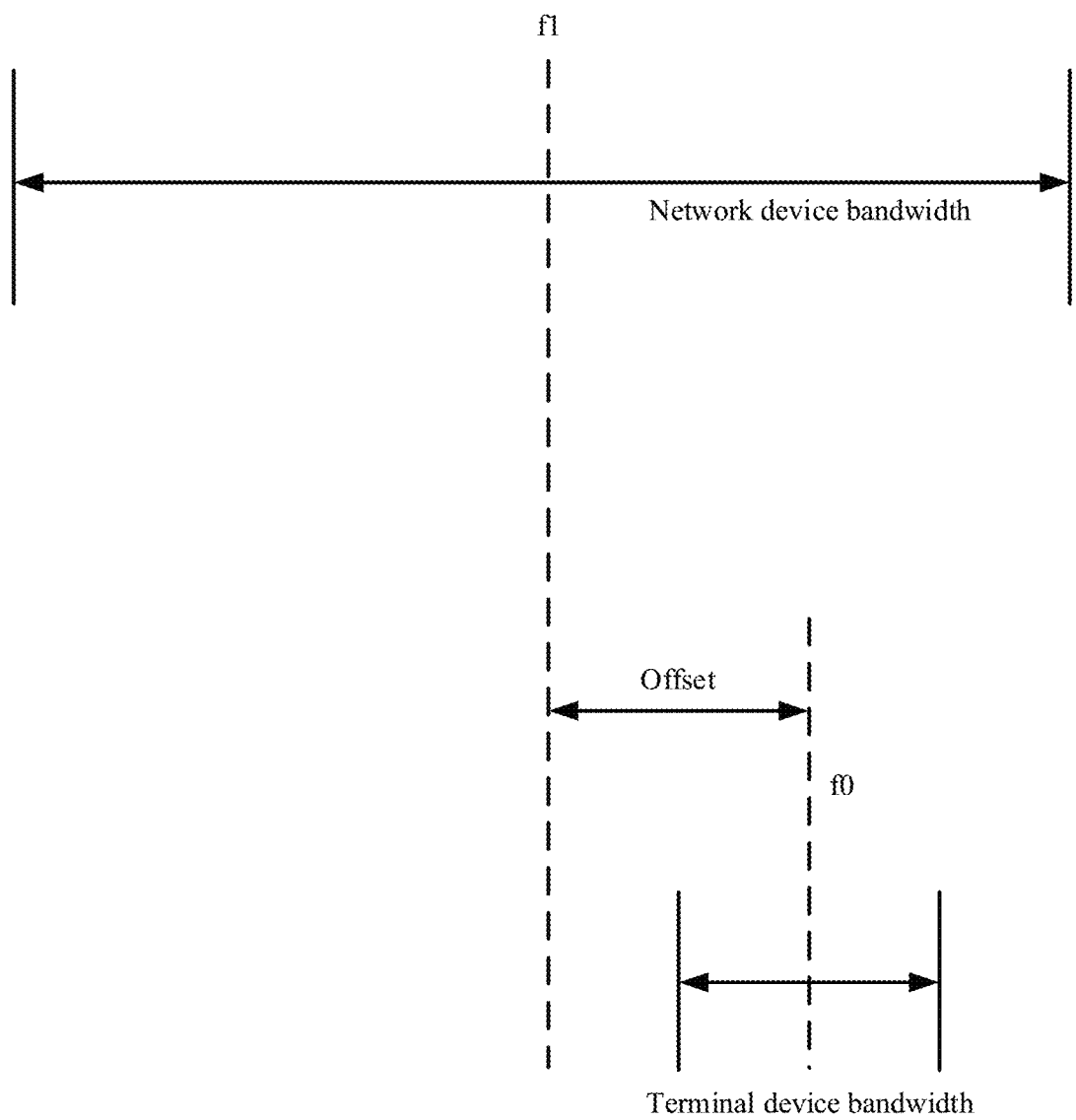
FIG. 19 is a schematic diagram when a network device and a terminal device use different reference frequencies in downlink signal transmission.

In downlink signal transmission, a reference frequency used by the network device to send the downlink signal may be the same as or different from a reference frequency used by the terminal device to receive the downlink signal. FIG. 19 is a schematic diagram when the network device and the terminal device use different frequencies in downlink signal transmission. As shown in FIG. 19, a center frequency of the network device is f1, and a frequency at which the terminal device receives the downlink signal is f0. f1 is different from f0. In other words, a reference frequency used by the network device to send the downlink signal is different from a reference frequency used by the terminal device to receive the downlink signal. In this case, a phase of the downlink signal received by the terminal deviates relative to the downlink signal sent by the network device. Consequently, the terminal device incorrectly receives the downlink signal. According to the method in this embodiment, the terminal device can determine the reference frequency at which the network device sends the downlink signal, to determine the phase offset, so that the terminal device can compensate for the phase offset when receiving the downlink signal, thereby preventing the terminal device from incorrectly receiving the downlink signal.

Figure 20:
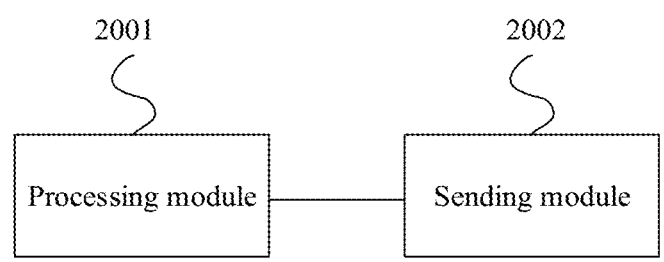
FIG. 20 is a structural diagram of modules of another network device according to this application.

FIG. 20 is a structural diagram of modules of another network device according to this application. As shown in FIG. 20, the network device includes: a processing module 2001, configured to determine a downlink signal, where the downlink signal is determined based on a first frequency position; and a sending module 2002, configured to send the downlink signal to a terminal device.

Further, that the downlink signal is determined based on a first frequency position includes: the downlink signal is a downlink baseband signal, and a phase of the downlink baseband signal is determined based on the first frequency position.

Further, the first frequency position is a pre-defined frequency position.

Further, the first frequency position is a frequency position determined based on indication information of the network device, and the indication information is used to indicate the first frequency position.

Figure 21:
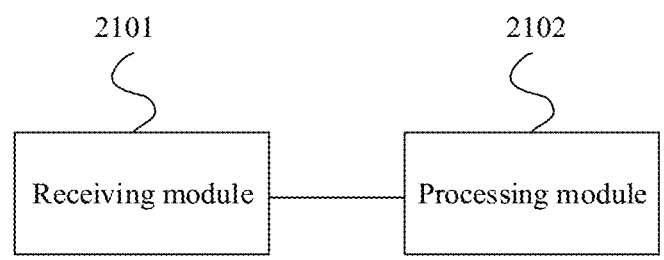
FIG. 21 is a structural diagram of modules of another terminal device according to this application.

FIG. 21 is a structural diagram of modules of another terminal device according to this application. As shown in FIG. 21, the terminal device includes: a receiving module 2101, configured to receive a downlink signal from a network device, where the downlink signal is determined based on a first frequency position, and the first frequency position is a pre-defined frequency position, or the first frequency position is a frequency position determined based on indication information of the network device; and a processing module 2102, configured to demodulate the downlink signal.

Further, that the downlink signal is determined based on a first frequency position includes: the downlink signal is a downlink baseband signal, and a phase of the downlink baseband signal is determined based on the first frequency position.

Further, that the first frequency position is a pre-defined frequency position includes: the first frequency position is a center frequency position of a preset subcarrier in a preset frequency domain resource block.

Further, the first frequency position is the frequency position determined based on the indication information of the network device, and the receiving module 2101 is further configured to: receive the indication information from the network device, where the indication information is used to indicate the first frequency position.

Further, the indication information is used to indicate a preset subcarrier in a preset frequency domain resource block, or the indication information is used to indicate a center frequency of a preset subcarrier in a preset frequency domain resource block, or the indication information is used to indicate a preset frequency domain resource block; and if the indication information is used to indicate a preset frequency domain resource block, the processing module 2102 is further configured to: determine a subcarrier in the preset frequency domain resource block based on the preset frequency domain resource block and a preset relationship between a subcarrier and a frequency domain resource block.

Figure 22:
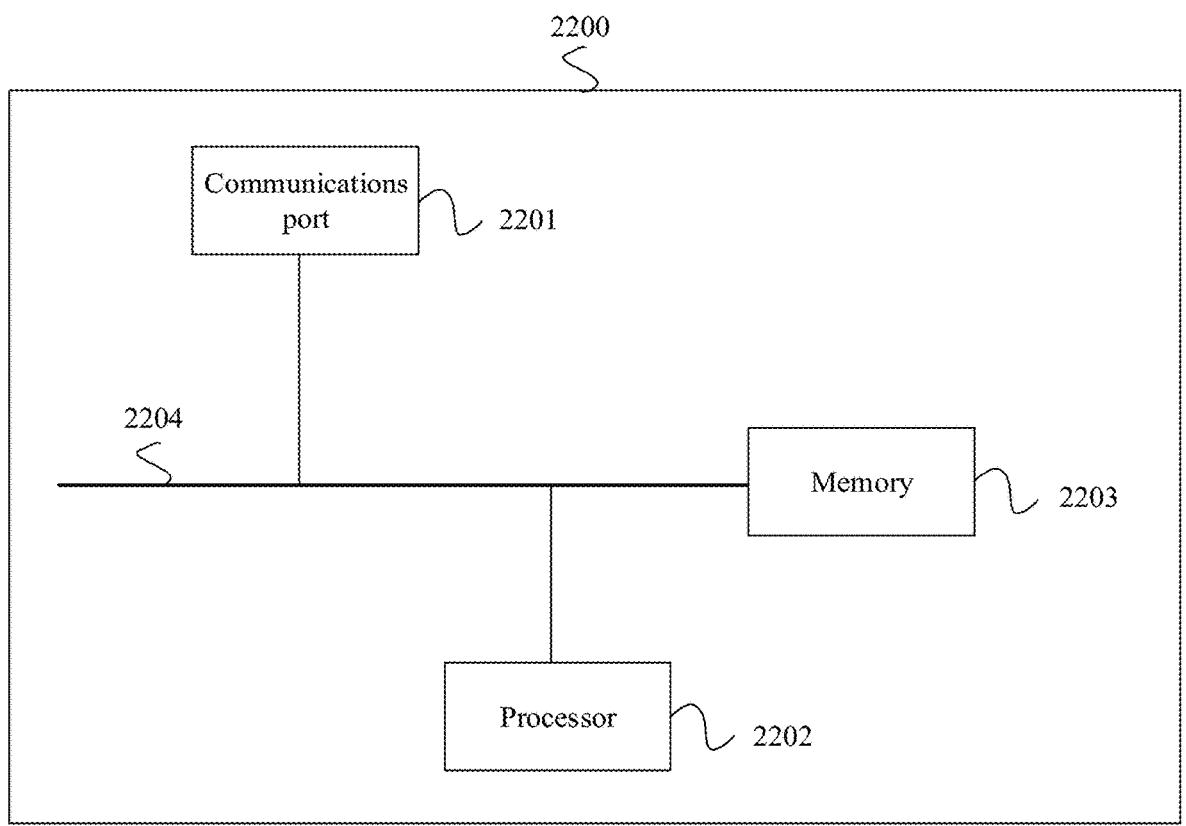
FIG. 22 is a physical block diagram of still another chip according to this application.

FIG. 22 is a physical block diagram of still another chip according to this application. The chip 2200 may be used for a network device. As shown in FIG. 22, the chip includes: at least one communications interface 2201, at least one processor 2202, and at least one memory 2203. The communications interface 2201, the processor 2202, and the memory 2203 are connected to each other by using a circuit (or by using a bus in some cases) 2204. The processor 2202 invokes an instruction stored in the memory 2203 to perform method steps corresponding to the network device in the foregoing still another signal sending and receiving method embodiment.

Figure 23:
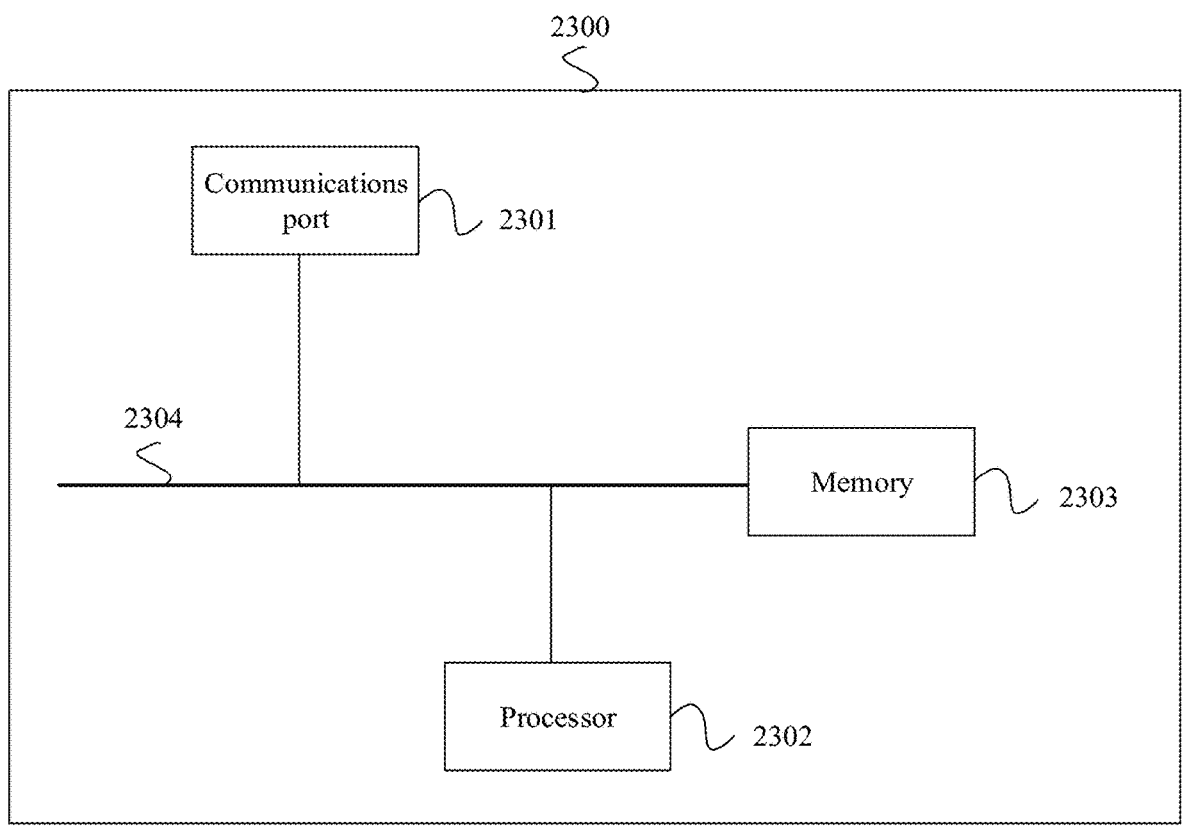
FIG. 23 is a physical block diagram of yet another chip according to this application.

FIG. 23 is a physical block diagram of yet another chip according to this application. The chip 2300 may be used for a terminal device. As shown in FIG. 23, the chip includes: at least one communications interface 2301, at least one processor 2302, and at least one memory 2303. The communications interface 2301, the processor 2302, and the memory 2303 are connected to each other by using a circuit (or by using a bus in some cases) 2304. The processor 2302 invokes an instruction stored in the memory 2303 to perform method steps corresponding to the terminal device in the foregoing still another signal sending and receiving method embodiment.

Figure 24:
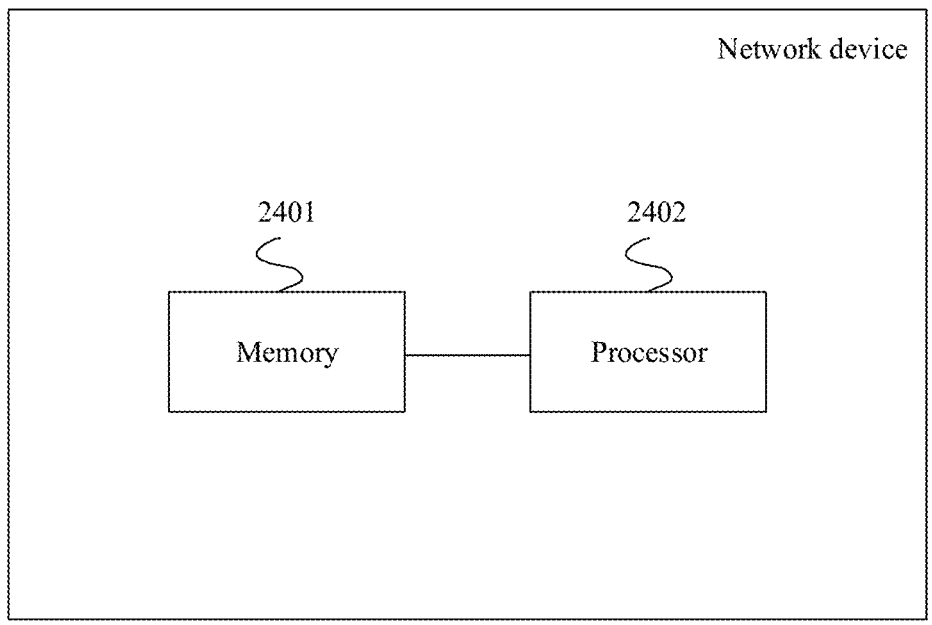
FIG. 24 is a physical block diagram of Embodiment 1 of another network device according to this application.

FIG. 24 is a physical block diagram of Embodiment 1 of another network device according to this application. As shown in FIG. 24, the network device includes: a memory 2401 and a processor 2402.

The memory 2401 is configured to store a program instruction, and the processor 2402 is configured to invoke the program instruction in the memory 2401 to implement a function corresponding to the network device in the foregoing still another signal sending and receiving method embodiment.

Figure 25:
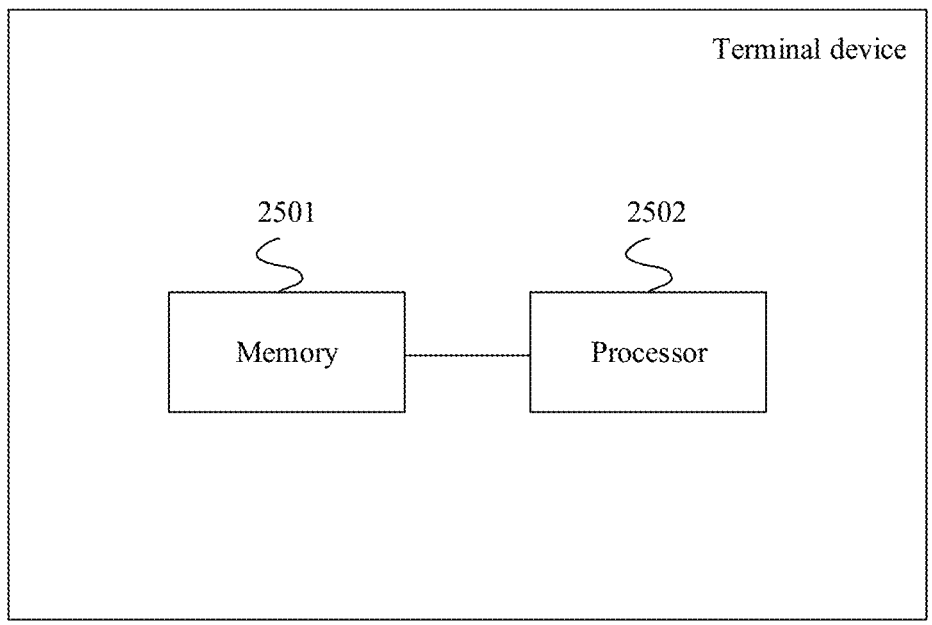
FIG. 25 is a physical block diagram of Embodiment 1 of another terminal device according to this application.

FIG. 25 is a physical block diagram of Embodiment 1 of another terminal device according to this application. As shown in FIG. 25, the terminal device includes: a memory 2501 and a processor 2502.

The memory 2501 is configured to store a program instruction, and the processor 2502 is configured to invoke the program instruction in the memory 2501 to implement a function corresponding to the terminal device in the foregoing still another signal sending and receiving method embodiment.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instruction is loaded and executed on a computer, the procedure or functions according to the embodiments of the present invention are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that the computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the embodiments and all changes and modifications falling within the scope of this application. It is clear that persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
generating, by a terminal device, a plurality of orthogonal frequency division multiplexing (OFDM) symbols; and
sending, by the terminal device, at least two OFDM symbols of the plurality of OFDM symbols to a network device in a first time unit, and sending at least two OFDM symbols of the plurality of OFDM symbols to the network device in a second time unit, wherein phase offsets of OFDM symbols of the at least two OFDM symbols sent in the first time unit are equal to phase offsets of OFDM symbols of the at least two OFDM symbols sent in the second time unit, a phase offset of a first OFDM symbol sent in the first time unit is not equal to the phase offset of at least one OFDM symbol other than the first OFDM symbol sent in the first time unit, and a duration of the first time unit is the same as a duration of the second time unit;
wherein for each OFDM symbol of the plurality of OFDM symbols, the phase offset of the respective OFDM symbol is a difference between a phase of a first time-domain sampling value at a first sampling time point when a first subcarrier mapping mode is used for the respective OFDM symbol and a phase of a second time-domain sampling value at the first sampling time point when a second subcarrier mapping mode is used for the same respective OFDM symbol.

2. The method according to claim 1, wherein the duration of the first time unit is a duration of a slot corresponding to a subcarrier spacing of 15 kHz.

3. The method according to claim 1, wherein the duration of the first time unit is a duration of a subframe.

4. The method according to claim 1, wherein:
in the first subcarrier mapping mode, a subcarrier center is mapped to a carrier frequency, and in the second subcarrier mapping mode, the subcarrier center is mapped to a frequency that has a preset offset value with the carrier frequency.

5. The method according to claim 4, wherein the preset offset value is 7.5 kHz.

6. A method, comprising:
receiving, by a network device, a plurality of orthogonal frequency division multiplexing (OFDM) symbols from a terminal device, wherein at least two OFDM symbols of the plurality of OFDM symbols are received in a first time unit, and at least two OFDM symbols of the plurality of OFDM symbols are received in a second time unit, wherein phase offsets of OFDM symbols of the at least two OFDM symbols received in the first time unit are equal to phase offsets of OFDM symbols of the at least two OFDM symbols received in the second time unit, a phase offset of a first OFDM symbol received in the first time unit is not equal to a phase offset of at least one OFDM symbol other than the first OFDM symbol received in the first time unit, and a duration of the first time unit is the same as a duration of the second time unit; and
demodulating, by the network device, the plurality of OFDM symbols;
wherein for each OFDM symbol of the plurality of OFDM symbols, the phase offset of the respective OFDM symbol is a difference between a phase of a first time-domain sampling value at a first sampling time point when a first subcarrier mapping mode is used for the respective OFDM symbol and a phase of a second time-domain sampling value at the first sampling time point when a second subcarrier mapping mode is used for the same respective OFDM symbol.

7. The method according to claim 6, wherein the duration of the first time unit is a duration of a slot corresponding to a subcarrier spacing of 15 kHz.

8. The method according to claim 6, wherein the duration of the first time unit is a duration of a subframe.

9. The method according to claim 6, wherein:
in the first subcarrier mapping mode, a subcarrier center is mapped to a carrier frequency, and in the second subcarrier mapping mode, the subcarrier center is mapped to a frequency that has a preset offset value with the carrier frequency.

10. The method according to claim 9, wherein the preset offset value is 7.5 kHz.

11. A terminal device, comprising:
a processor, configured to generate a plurality of orthogonal frequency division multiplexing (OFDM) symbols; and
a communication port, configured to send at least two OFDM symbols of the plurality of OFDM symbols to a network device in a first time unit, and send at least two OFDM symbols of the plurality of OFDM symbols to the network device in a second time unit, wherein phase offsets of OFDM symbols of the at least two OFDM symbols sent in the first time unit are equal to phase offsets of OFDM symbols of the at least two OFDM symbols sent in the second time unit, a phase offset of a first OFDM symbol in the first time unit is not equal to a phase offset of at least one OFDM symbol other than the first OFDM symbol sent in the first time unit, and a duration of the first time unit is the same as a duration of the second time unit;

wherein for each OFDM symbol of the plurality of OFDM symbols, the phase offset of the respective OFDM symbol is a difference between a phase of a first time-domain sampling value at a first sampling time point when a first subcarrier mapping mode is used for the respective OFDM symbol and a phase of a second time-domain sampling value at the first sampling time point when a second subcarrier mapping mode is used for the same respective OFDM symbol.

12. The terminal device according to claim 11, wherein the duration of the first time unit is a duration of a slot corresponding to a subcarrier spacing of 15 kHz.

13. The terminal device according to claim 11, wherein the duration of the first time unit is a duration of a subframe.

14. The terminal device according to claim 11, wherein:
in the first subcarrier mapping mode, a subcarrier center is mapped to a carrier frequency, and in the second subcarrier mapping mode, the subcarrier center is mapped to a frequency that has a preset offset value with the carrier frequency.

15. The terminal device according to claim 14, wherein the preset offset value is 7.5 kHz.

16. A network device, comprising:
a communication port, configured to receive a plurality of orthogonal frequency division multiplexing OFDM symbols from a terminal device, wherein at least two OFDM symbols of the plurality of OFDM symbols are received in a first time unit, and at least two OFDM symbols of the plurality of OFDM symbols are received in a second time unit, wherein phase offsets of OFDM symbols of the at least two OFDM symbols received in the first time unit are equal to phase offsets of OFDM symbols of the at least two OFDM symbols received in the second time unit, a phase offset of a first OFDM symbol received in the first time unit is not equal to a phase offset of at least one OFDM symbol other than the first OFDM symbol received in the first time unit, and a duration of the first time unit is the same as a duration of the second time unit; and
a processor, configured to demodulate the plurality of OFDM symbols;
wherein for each OFDM symbol of the plurality of OFDM symbols, the phase offset of the respective OFDM symbol is a difference between a phase of a first time-domain sampling value at a first sampling time point when a first subcarrier mapping mode is used for the respective OFDM symbol and a phase of a second time-domain sampling value at the first sampling time point when a second subcarrier mapping mode is used for the same respective OFDM symbol.

17. The network device according to claim 16, wherein the duration of the first time unit is a duration of a slot corresponding to a subcarrier spacing of 15 kHz.

18. The network device according to claim 16, wherein the duration of the first time unit is a duration of a subframe.

19. The network device according to claim 16, wherein:
in the first subcarrier mapping mode, a subcarrier center is mapped to a carrier frequency, and in the second subcarrier mapping mode, the subcarrier center is mapped to a frequency that has a preset offset value with the carrier frequency.

20. The network device according to claim 19, wherein the preset offset value is 7.5 kHz.

\* \* \* \* \*